US006521247B1

(12) United States Patent
deVries

(10) Patent No.: US 6,521,247 B1
(45) Date of Patent: Feb. 18, 2003

(54) DUAL IRON CONTAINING NUTRITIONAL SUPPLEMENT

(75) Inventor: Tina deVries, Long Valley, NJ (US)

(73) Assignee: Warner Chilcott Laboratories Ireland Limited, Rockaway, NJ (US)

(*) Notice: Subject to any disclaimer, the term of this patent is extended or adjusted under 35 U.S.C. 154(b) by 0 days.

(21) Appl. No.: 09/539,360

(22) Filed: Mar. 31, 2000

Related U.S. Application Data

(60) Provisional application No. 60/148,803, filed on Aug. 13, 1999, and provisional application No. 60/148,806, filed on Aug. 13, 1999.

(51) Int. Cl.[7] .............................................. A61K 47/00
(52) U.S. Cl. ...................... 424/439; 424/441; 424/451; 424/452; 424/457; 424/464; 424/465; 424/468; 424/489; 426/73; 426/74; 514/276; 514/251
(58) Field of Search ................................. 424/439, 441, 424/451, 452, 457, 464, 465, 468, 489; 426/73, 74; 514/276, 251, 814

(56) References Cited

U.S. PATENT DOCUMENTS

| 2,470,804 A | | 5/1949 | Clark | |
|---|---|---|---|---|
| 3,012,937 A | | 12/1961 | Schlichting | |
| 3,975,513 A | | 8/1976 | Hecht et al. | |
| 3,992,555 A | | 11/1976 | Kovacs | |
| 4,431,634 A | * | 2/1984 | Ellenbogen | 424/147 |
| 4,582,709 A | | 4/1986 | Peters et al. | |
| 4,725,427 A | | 2/1988 | Ashmead et al. | |
| 4,752,479 A | | 6/1988 | Briggs et al. | |
| 4,945,083 A | * | 7/1990 | Jansen, Jr. | 514/52 |
| 5,061,815 A | | 10/1991 | Leu | |
| 5,534,275 A | | 7/1996 | Humbert et al. | |
| 5,869,084 A | * | 2/1999 | Paradissis et al. | 424/439 |

FOREIGN PATENT DOCUMENTS

| CA | 594956 | 3/1960 |
|---|---|---|
| EP | 0 208 362 A1 | 1/1987 |
| EP | 0 192 367 B1 | 8/1989 |
| JP | 3-139263 A | 6/1991 |
| WO | WO 95/22908 | 8/1995 |

OTHER PUBLICATIONS

H.A. Huebers et al., "Absorption of carbonyl iron," *J. Lab. Clin. Med.*, 108(5):473–478 (Nov. 1986).
William K. Simmons et al., "Evaluation of a gastric delivery system for iron supplementation in pregnancy[1–4]", *Am. J. Clin. Nutr.*, 58:622–626 (1993).

* cited by examiner

*Primary Examiner*—Thurman K. Page
*Assistant Examiner*—Liliana Di Nola-Baron
(74) *Attorney, Agent, or Firm*—Akin Gump Strauss Hauer & Feld, L.L.P.

(57) ABSTRACT

The present invention relates to a nutritional supplement which comprises two different iron compounds, namely a rapidly dissolving iron compound and a slowly dissolving iron compound. The tablet is particularly contemplated for administration to women as a prenatal supplement, during pregnancy, and during lactation. Methods of alleviating iron deficiency and diseases and disorders associated therewith are also disclosed.

56 Claims, No Drawings

DUAL IRON CONTAINING NUTRITIONAL SUPPLEMENT

CROSS-REFERENCE TO RELATED APPLICATIONS

This application is entitled to priority pursuant to 35 U.S.C. §119(e) to U.S. provisional patent applications 60/148,803 and 60/148,806, both of which were filed on Aug. 13, 1999.

FIELD OF THE INVENTION

The present invention relates to a nutritional supplement and, particularly, to an oral nutritional supplement which contains two or more forms of iron. The nutritional supplement can also include vitamins, non-ferrous minerals, and other ingredients.

BACKGROUND OF THE INVENTION

Vitamin, multi-vitamin, and/or mineral preparations are commonly administered to inhibit, to prevent, or to reduce the frequency or severity of (i.e. "to alleviate") specific medical disorders. In particular, iron-containing preparations are used to alleviate disorders related to iron deficiency (e.g. anemia). Such preparations are also used as nutritional supplements. Pregnant women, in particular, are known to require significant dietary supplementation with iron, vitamins (e.g. folic acid), and non-ferrous minerals to minimize the risk of birth deformities in the fetus, to improve the chances of a successful delivery and to improve birth weight of the fetus. Pregnant and lactating women commonly require iron to alleviate or treat iron-deficiency anemia. Indeed, various patents are directed to improving the efficacy of iron supplementation during pregnancy.

In addition to their use in pregnant and lactating women, iron supplements containing vitamins, minerals, or both are well known and are used as sources of dietary iron to treat or prevent iron deficiency in mammals. These iron supplements generally include a single form of iron, for example, an iron (II) salt (i.e. a salt containing divalent or ferrous iron), an iron (III) salt (i.e. a salt containing trivalent or ferric iron), or iron (0) powder (e.g. carbonyl iron, typically made by heating gaseous iron pentacarbonyl, $Fe(CO)_5$, which deposits metallic iron as submicroscopic crystals that form microscopicspheres). The iron in known supplements has been delivered in rapid release forms and in controlled release dosage forms.

Prior art nutritional supplements containing a rapid release dosage form of iron have generally contained a rapidly dissolving iron salt, since certain iron salts are significantly more soluble in water and gastrointestinal fluids than other salts and metallic forms of iron. Administration of rapid release dosage forms can cause excessively high $C_{max}$ values (maximum concentration of iron in blood) in patients and short $T_{max}$ values (time elapsed between administration of the supplement and attainment of $C_{max}$). These formulations can cause unpleasant, harmful, or even fatal side effects (Crosby, 1978, Arch. Intern. Med. 138:766–767). By way of example, such side effects include stomach irritation, constipation, and iron poisoning. Toxic side effects of iron can be attributed to the high solubility and the high dissolution rate of certain iron salts (e.g. ferrous sulfate) in the gastrointestinal tract. The incidence of accidental iron poisoning (e.g. by young children who ingest prenatal vitamin supplements) could be reduced by reducing the amount of highly soluble iron in iron supplements, or by removing such forms of iron from the supplement.

Prior art controlled release dosage forms of iron-containing nutritional supplements have generally used an iron (II) salt encapsulated in or mixed with a release rate modifying matrix, one of certain iron (III) salts which exhibit poor solubility, carbonyl iron or one of the other metallic forms of iron (which also exhibit poor solubility), a certain crystalline form of iron oxide, or an iron salt or carbonyl iron complexed with a protein, an amino acid, an organic acid, a natural polymer, an anionic complexing agent, or a synthetic polymer. Administration of known controlled release dosage forms generally results in temporary reductions of blood iron levels between consecutive doses. These temporary reductions can be due to the tapered delivery rate of iron from a first dose coupled with a delayed, or slow initial, delivery of iron from a second dose. At least certain supplements designed to provide sustained delivery of iron have been associated with unpleasant tastes and odors, nausea, stomach irritation, and gas formation (e.g. manifested as eructation).

Commercially available iron supplements include, for example, GERITOL™, FERROCONTIN CONTINUS™, FERRO RETARD™, FERRONICUM™, DUROFERON® DURETTER®, DUROFERON® DURULES®, TARDYFERON™, ERYFER™, FE-PM™, FERRO-GRADUMET™, FEOSPAN™ SPANSULE™, FERROGRAD™, HEMOFER™, NATALINS RX™, PRENATAL1/1™, STUARTNATAL PLUS™, PRENATE 90™, ONE-A-DAY™, PROFERDEX™, DEXFERRUM™, INFED™ and PLEXAFER™-F, among others.

U.S. Pat. No. 4,752,479 to Briggs et al. discloses a multi-vitamin and mineral dietary supplement which includes (a) one or more divalent dietary mineral components such as calcium or magnesium; (b) vitamins; and (c) a bioavailable iron component, presented in a controlled release form and adapted to be released in a controlled manner in the gastrointestinal tract.

U.S. Pat. No. 5,869,084 to Paradissis et al. discloses multi-vitamin and mineral supplements for women which are designed to meet the nutritional requirements for women at the various stages of their lives.

U.S. Pat. No. 5,494,678 to Paradissis et al. discloses multi-vitamin and mineral supplements for pregnant women which are designed to maximize fetal development and maternal health during each trimester of pregnancy.

U.S. Pat. No. 3,975,513 to Hecht et al. discloses a sustained released iron-containing supplement for prophylaxis against trace elemental deficiency diseases in animals. The iron supplement is shaped and sized so as to be retained in the stomach of the animal, and includes an acid-resistant sustained release plastic coating.

Chewable multi-vitamin tablets and powdered multi-vitamin dietary supplements are well known in the nutritional products industry. These vitamin-containing products are intended to provide a nutritious and bioavailable product while at the same time providing a product with good palatability, or organoleptic effect. Generally, however, the more vitamins and minerals a product contains the less palatable the product is.

Taste-masking technology has been developed for preparation of palatable chewable multi-vitamin tablets. This technology generally requires encapsulation of vitamins in the tablet or addition of sugars, sweeteners, acceptably flavored agents, or some combination of these, to the vitamin-containing composition before it is formulated into a tablet.

U.S. Pat. No. 4,684,534 to Valentine discloses a quick-liquefying chewable tablet which resists absorption of moisture but quickly liquefies and melts in the mouth once it has been chewed. This tablet is highly palatable and can contain vitamins.

There is a significant, continuing need for an iron supplement which can be administered to a human patient in order to safely and efficaciously deliver a nutritionally relevant amount of iron to the patient. In view of safety (e.g. accidental poisoning) and patient compliance issues (e.g. failure to consistently ingest iron supplements, owing to unpleasant side effects, unpleasant taste or odor, inconvenient tablet size, or some combination of these) which exist with regard to prior art iron supplements, a particular need remains for an iron supplement having a reduced risk of accidental poisoning, reduced side effects, and greater patient acceptance, which can lead to improved patient compliance with a dosing regimen. The present invention satisfies these needs.

SUMMARY OF THE INVENTION

The present invention relates to a nutritional supplement intended for administration to a human (although it can be administered to another animal). The supplement contains at least two iron compounds, namely a slowly dissolving pharmaceutically acceptable iron compound and a rapidly dissolving pharmaceutically acceptable iron compound. The supplement can also contain one or more vitamins, one or more non-ferrous minerals, or some combination of these. By way of example, the supplement can contain folic acid (e.g. such that a daily dose of the supplement comprises at least about 1 milligram of folate or a salt thereof).

Preferably, a daily dose (e.g. one, two, or more tablets or capsules) of the supplement contains a nutritionally relevant amount of iron, such as the U.S. F.D.A. recommended daily (R.D.A.) allowance of iron for an individual for whom the dose is intended (e.g. a pregnant or lactating woman), although the dose can comprise a greater amount of iron. By way of example, the dose can provide 1–100 milligrams (e.g. 15, 30, 45, 60, or 90 milligrams) of iron.

In one embodiment of the nutritional supplement, the supplement comprises (a) about 1–1000 milligrams of iron (e.g. about 60 or 63 milligrams);

(b) about 0.1–2.0 milligrams of folic acid (e.g. about 1.0 or 1.2 milligrams);

(c) about 100–4000 or 100–2000 International Units (I.U.) of vitamin A (e.g. about 1000 or 1100 I.U.);

(d) about 0.2–8 milligrams of vitamin $B_1$ (e.g. about 2.0 or 2.4 milligrams);

(e) about 0.5–10 milligrams of vitamin $B_2$ (e.g. about 3 or 3.45 milligrams);

(f) about 2–50 milligrams of vitamin $B_6$ (e.g. about 10 or 12 milligrams);

(g) about 2–20 micrograms of vitamin $B_{12}$ (e.g. about 12 or 14.4 milligrams);

(h) about 20–200 milligrams of vitamin C (e.g. about 120 or 132 milligrams);

(i) about 100–800 I.U. of vitamin $D_3$ (e.g. about 400 or 440 I.U.);

(j) about 1–200, 1–50, or 1–20 I.U. of vitamin E (e.g. about 11 or 12 I.U.); and (k) about 5–40 milligrams of one of niacin and niacinamide (e.g. about 20 or 22 milligrams of niacinamide or an equivalent molar amount of niacin).

Iron in the supplement can be provided in the form of both ferrous sulfate (or ferrous fumarate) and carbonyl iron, for example. Vitamin A can be provided, for example, in the form of beta carotene, vitamin A acetate, or some combination thereof. Vitamin $B_1$ can, for example, be provided in the form of thiamine mononitrate. Vitamin $B_6$ can be provided in the hydrochloride form of pyridoxine, vitamin C can be included as ascorbic acid or an ascorbate salt (e.g. sodium ascorbate), and vitamin E can be included as vitamin E acetate, for example.

Other features, advantages and embodiments of the invention will be apparent to those of ordinary skill in the art from the following description, examples and appended claims.

DETAILED DESCRIPTION OF THE INVENTION

As noted above, the nutritional supplement of the present invention contains at least one slowly dissolving pharmaceutically acceptable iron compound and a rapidly dissolving pharmaceutically acceptable iron compound, along with other nutritionally valuable ingredients and appropriate excipients that have the benefits and characteristics set forth hereinafter.

The iron compounds which are included in the nutritional supplement described wherein can be substantially any pharmaceutically acceptable iron compound, with the proviso that the supplement comprises at least one rapidly dissolving iron compound and at least one slowly dissolving iron compound. The rapidly dissolving iron compound can, for example, be an iron (II) salt or an iron (III) salt. The slowly dissolving iron compound can, for example, be an iron (II) salt, an iron (III) salt, or a metallic form of iron (e.g. carbonyl iron, such as carbonyl iron having a particle size or distribution described herein). Examples of iron compounds which can be used in the nutritional supplement include, without limitation, ferrous fumarate, ferrous sulfate, ferrous folate, an iron dextran, ferric oxyhydroxide dextran, a chitosan derivative of iron, an oligosaccharide derivative of iron, ferrous acetyl salicylate, ferrous gluconate, ferrous diphosphate, carbonyl iron, ferric orthophosphate, ferrous glycine sulfate, ferrous chloride, ferrous ammonium citrate, ferric ammonium citrate, ferric ammonium tartrate, ferric phosphate, ferric potassium tartrate, ferric albuminate, ferric cacodylate, ferric hydroxide, ferric pyrophosphate, ferric quinine citrate, ferric valerate, saccharated iron oxide, iron oxide, ferric chloride, ferrous iodide, ferrous nitrate, ferrous glycerophosphate, ferrous formate, an amino acid and iron salt, an iron salt of a protein hydrolysate, ferrous lactate, ferrous tartrate, ferrous succinate, ferrous glutamate, ferrous citrate, ferrous pyrophosphate, ferrous cholinisocitrate, ferrous carbonate, an iron-sugar-carboxylate complex, ferrous sucrate-malate, ferrous sucrate citrate, ferrous fructate-citrate, ferrous sucrate-ascorbate, and ferrous fructate-ascorbate. The rapidly dissolving iron compound is preferably selected such that substantially all of the compound dissolves within about 3 hours following oral administration of the supplement to a human. The slowly dissolving iron compound is preferably selected such that substantially all of the compound dissolves more than 3 hours following administration of the supplement to a human (e.g. substantially all of the compound dissolves between 3 and 48 hours or between 8 and 24 hours following administration).

The ratio of the amounts (on an elemental iron weight basis, for example) of the rapidly and slowly dissolving forms of iron which are present in the nutritional supplement is not critical. Some embodiments of the nutritional supplement comprise a greater amount of one form than the other.

Preferred embodiments include those in which the ratio of the two forms of iron is from about 1:3 to about 3:1, such as about 1:1 or about 1:2 or 2:1, or about 1:3 or 3:1.

In one aspect, the nutritional supplement described herein is a controlled release iron supplement solid dosage form comprising at least one rapidly dissolving form of iron, at least one slowly dissolving form of iron and at least one pharmaceutically acceptable carrier, wherein the solid dosage provides a controlled release of the iron absent a release rate modifier.

The claimed iron supplement provides an improved release profile for iron, since it provides a rapid increase in iron or hemoglobin levels in blood and maintains a beneficial level of iron and/or hemoglobin in the blood for an extended period of time. The invention also provides an iron supplement having reduced side effects typically associated with iron supplements comprising similar amounts of elemental iron. The dosage form can include one or more pharmaceutically acceptable excipients, flavorants, sweeteners, or some combination of these.

In one aspect, the nutritional supplement is a controlled release iron supplement solid dosage form comprising:
 (a) a first composition for slowly delivering a pharmaceutically acceptable iron compound;
 (b) a second composition for rapidly delivering a pharmaceutically acceptable iron compound; and
 (c) one or more pharmaceutically acceptable excipients; wherein, the solid dosage form provides a controlled delivery of iron in the absence of a release rate modifier. The supplement can further comprise:
 (d) one or more vitamins;
 (e) one or more non-iron minerals;
 (f) one or more flavorants;
 (g) one or more sweeteners; and/or
 (h) one or more release rate modifiers.

The solid dosage form of the nutritional supplement can be a tablet, capsule, caplet, granule, particulate, agglomerate, spansule, chewable tablet, lozenge, or troche. Dosage forms which persist in the mouth (e.g. lozenges and troches) are not preferred, given the unpleasant taste associated with iron and other nutrients (e.g. B vitamins)

Other preferred embodiments of the invention include those wherein: (1) the solid dosage form is a tablet coated with one or more coats at least one of which optionally comprises a flavorant; (2) vitamins and minerals are mixed with the one or more excipients prior to pressing into a tablet; (3) the second composition comprises a rapidly dissolving iron compound; (4) the rapidly dissolving iron comprises one or more iron (II) iron or III salts; (5) the first composition comprises a slowly dissolving iron compound; (6) the slowly dissolving iron is carbonyl iron; (7) calcium is excluded from the solid dosage form, or is present in an amount which is less than a therapeutic amount, e.g. less than 10% of the R.D.A. for calcium.

Pharmaceutically acceptable excipients which can be included in the nutritional supplement include, for example, tablet binders, acidifying agents, alkalinizing agents, adsorbents, preservatives, antioxidants, buffering agents, colorants, dispersants, thickeners, solubilizing agents, encapsulating agents, stiffening agents, tablet antiadherents, tablet and capsule diluents, tablet coating agents, tablet direct compression excipients, tablet disintegrants, tablet glidants, tablet lubricants, tablet opaquants, and tablet polishing agents.

In a preferred form, the active ingredients of the iron supplement are mixed with the one or more excipients and compressed to form a tablet. The tablet is then optionally coated with one or more coats, at least one of which preferably comprises a flavorant.

Another aspect of the invention provides a chewable iron supplement controlled release solid dosage form comprising:
 (1) at least one first composition for slowly delivering iron;
 (2) at least one second composition for rapidly delivering iron; and
 (3) at least one agglomerate comprising at least about 25% by weight of a carbohydrate based material and about 1–10% by weight of a water soluble binder; wherein the solid dosage form provides a controlled release of the iron absent a release rate modifier.

The chewable tablet preferably has an interior that is softer than its exterior such that the tablet dissolves rapidly in the mouth when the tablet is chewed. Minerals or vitamins included in the chewable tablet can be provided individually, in combinations of two or more, and/or along with the agglomerate as described herein.

Other preferred embodiments include those wherein the agglomerate comprises 1–99% by weight of carbohydrate based material selected from the group consisting of dextrose, dextrose monohydrate, maltodextrin, fructose, sucrose, lactose, maltose mannitol, and xylose, and 1–10% by weight of water soluble binder selected from the group consisting of maltodextrin, corn syrup solids, dextrose, sucrose, poly(vinylpyrrolidone) and cooked starch paste. The most preferred agglomerates include those prepared according to the processes disclosed in U.S. Pat. No. 4,684,534, the entire disclosure of which is hereby incorporated by reference. The vitamins and minerals can be included in the agglomerate individually or in combinations of two more prior to being mixed with other ingredients.

In one embodiment, the nutritional supplement is a controlled release solid dosage form comprising
 (a) from about 0.1 milligram to about 2.0 milligrams, preferably about 1.0 milligram, of folic acid, or a pharmaceutically acceptable salt form thereof;
 (b) from about 100 I.U. to about 800 I.U., preferably about 400 I.U., of Vitamin $D_3$;
 (c) from about 100 I.U. to about 4000 I.U., preferably about 100–2000 I.U. (e.g. 1000 I.U.), of Beta carotene or another form or precursor of vitamin A (e.g. vitamin A acetate);
 (d) from about 0.2 milligram to about 8 milligrams, preferably about 2 milligrams, of Vitamin $B_1$;
 (e) from about 0.5 milligram to about 10 milligrams, preferably about 3 milligrams, of Vitamin $B_2$;
 (f) from about 2 milligrams to about 20 milligrams, preferably about 10 milligrams, of Vitamin $B_6$;
 (g) from about 2 micrograms to about 20 micrograms, preferably about 12 micrograms, of Vitamin $B_{12}$;
 (h) from about 1 I.U. to about 200 I.U., preferably about 1–20 I.U. (e.g. 11 I.U.), of Vitamin E acetate;
 (i) from about 20 milligrams to about 200 milligrams, preferably about 120 milligrams, of Vitamin C dosed in the form of ascorbic acid and/or a pharmaceutically acceptable salt thereof (e.g. sodium ascorbate);
 (j) from about 5 milligrams to about 40 milligrams, preferably about 20 milligrams, of niacinamide;
 (k) one or more rapidly dissolving iron compounds;
 (l) one or more slowly dissolving iron compounds selected from the group consisting of carbonyl iron, a slowly dissolving iron (II) salt and a slowly dissolving iron (III) salt; and (m) one or more pharmaceutically acceptable excipients; wherein the solid dosage provides a controlled release of the iron absent a release rate modifier.

The iron supplement solid dosage form can further comprise a release rate modifier that modulates the delivery of an iron compound, vitamin, mineral or other active ingredient.

The invention includes a method of alleviating an iron deficiency related disease or disorder in a human. This method comprises administering an iron-containing nutritional supplement described herein to the human (e.g. prior to, during, or following onset of the disease or disorder). Examples of diseases and disorders which can be alleviated using this method include anemia, birth defects, and low birth weight. The human to whom the supplement is administered is preferably a human, and can be one who is afflicted with the disease or disorder, or who is at risk for developing the disease or disorder. By way of example, the nutritional supplement can be administered to a pregnant or lactating woman, or to a woman who anticipates becoming pregnant. The nutritional supplement can also be administered to a woman who is nursing an infant for the purpose of providing the nutrients in the supplement to the infant.

The compositions and methods described herein can be used with substantially any prior art iron-containing nutritional supplement by, for example, replacing a portion of the iron compound in the prior art supplement with a rapidly or slowly dissolving iron compound. For example, when a prior art supplement contains a slowly dissolving iron compound, the supplement can be improved by replacing a portion (i.e. less than all) of the slowly dissolving iron compound with a rapidly dissolving iron compound. Conversely, when a prior art supplement contains a rapidly dissolving iron compound, the supplement can be improved by replacing a portion (i.e. less than all) of the rapidly dissolving iron compound with a slowly dissolving iron compound. Such replacement can be performed at the time the supplement is made.

The iron compounds, vitamins, minerals, excipients, agglomerates, and other ingredients included in the solid dosage form of the invention are commercially available and may be obtained from manufacturers or distributors such as Aldrich Chemical Co., FMC Corp., Bayer, BASF, Takeda Chemical Corp., Particle Dynamics, Inc., Generichem, Mallinckrodt, Roche, Formost, ISP, Colorcon, Tanabe, Avebe, Degusa, Ross Wax, Crompton & Knowles, Ashland Chemical, and others.

The invention relates, in one aspect, to the discovery that nutritional supplements which exhibit advantageous properties, relative to prior art nutritional supplements, can be made by combining a slowly dissolving iron compound and a rapidly dissolving iron compound. Such supplements can, and preferably do, contain one or more vitamins and non-ferrous minerals. By providing elemental iron in the form of both the rapidly dissolving iron compound and the slowly dissolving iron compound, one or more disadvantages which are inherent in nutritional supplements which contain only one of these types of iron compounds can be decreased or avoided.

Rapidly dissolving iron compounds (e.g. ferrous sulfate) can dissolve relatively rapidly in the digestive tract of a mammal (e.g. a human child). Therefore, such compounds can render a nutritional supplement poisonous if the intended dosage of the supplement is exceeded. This toxicity results from effects of elemental iron on the gastrointestinal tract, the cardiovascular system, and the central nervous system. Also, because the effects of elemental iron on the gastrointestinal tract (e.g. manifested as gastric irritation, nausea, constipation, etc.) can correlate with iron concentration in gastric and intestinal fluids, the severity of these effects can be affected by the amount of rapidly dissolving iron compound which is orally administered to a mammal.

A shortcoming of prior art nutritional supplements which contain rapidly dissolving iron compounds is that the iron content of those supplements is sufficiently high that unpleasant gastrointestinal symptoms accompany their use. Apart from being merely unpleasant, such symptoms can dissuade patients from continuing to use the supplement, even when its use is medically necessary or advisable. By way of example, gastrointestinal effects (e.g. stomach upset and constipation) associated with use of prenatal nutritional supplements which contain a rapidly dissolving iron compound dissuade women from continuing to take the supplements before and during pregnancy and during nursing. This reduced patient compliance increases the rates of iron deficiency related diseases and disorders among non-compliant women, their fetuses, and their children. Examples of such diseases and disorders include maternal pregnancy- and lactation-related anemias, low birth weight, fetal developmental anomalies (i.e. birth defects), and infant malnutrition and anemia.

In some prior art nutritional substitutes, the side effects associated with rapidly dissolving iron compounds are avoided by substituting a slowly dissolving iron compound (e.g. carbonyl iron; Huebers et al., 1986, J. Lab. Clin. Med. 108:473–478) in place of the rapidly dissolving compound. However, many individuals experience an unpleasant taste sensation or eructation when taking supplements which contain a nutritionally relevant amount of a slowly dissolving iron compound. These side effects also limit patient compliance with a course of nutritional supplementation, leading to the morbidity referred to above.

Although the skilled worker would expect that co-administration to a patient of a rapidly dissolving iron compound and a slowly dissolving iron compound would induce the symptoms corresponding to both types of compounds, the present inventor has surprisingly discovered that such co-administration instead reduces the side effects associated with these compounds. While not being bound by any particular theory of operation, it is believed that the side effects attributable to slowly and rapidly dissolving iron compounds may be most noticeable when the compounds are used individually in nutritionally relevant amounts. However, the side effects attributable to these compounds may be less noticeable or even undetectable when the compounds are used in lesser amounts, such as amounts whereby neither type of compound alone provides a full day's nutritional requirement. When the compounds are co-administered, their side effects are not additive, but instead are independently less noticeable or undetectable. Thus, for example, by providing a nutritive amount of iron to a patient by administering a supplement which contains a portion of the iron in the form of a rapidly dissolving iron compound and the balance in the form of a slowly dissolving iron compound, the side effects associated with both types of compounds can be reduced or avoided. Reduction of side effects can improve patient compliance, leading to reduction of morbidity. Furthermore, because slowly dissolving iron compounds are less toxic than rapidly dissolving iron compounds (Crosby, 1978, Arch. Intern. Med. 138:766–767), morbidity and mortality associated with accidental overdose of iron-containing supplements can be reduced by providing the supplements in a form in which a portion of the iron content is provided in a slowly dissolving form.

The recommended daily allowance of elemental iron for women, as established by the United States Food and Drug Administration Center for Food Safety and Applied Nutrition (revised 1989), is about 15 milligrams per day. Ingestion of 30 milligrams of iron per day is recommended for pregnant women. In addition, pregnant women are recommended to ingest at least about 1 milligram of folic acid during pregnancy, and preferably during weeks or months preceding pregnancy. The compositions and methods described herein are useful for providing iron to mammals, and are intended to be used, for example, to administer iron to women, including pregnant women, women anticipating pregnancy, and lactating women. The compositions and methods can also be used to administer one or more vitamins or non-ferrous minerals to men or women. By way of example, the compositions described herein include prenatal vitamin supplements containing iron (i.e. in both rapidly and slowly dissolving forms), folic acid, and optionally, other vitamins and minerals. Further by way of example, the compositions include daily vitamin/mineral supplements for administration to mammals, regardless of gender and species.

The term "active ingredient" as used herein encompasses any material such as a vitamin, mineral, iron compound (i.e. a rapidly dissolving iron compound or a slowly dissolving iron compound), flavorant, sweetener, or other nutrient and combinations thereof. Active ingredients also include but are not limited to food acids; insoluble metal and mineral hydroxides, carbonates, oxides, polycarbophils and salts thereof; adsorbates of active drugs on a magnesium trisilicate base and on a magnesium aluminum silicate base.

The vitamins, iron compounds, and non-ferrous minerals used in the nutritional supplement of the invention can be used in essentially any commercially available form. They can, for example, be provided with an agglomerate. They can also be provided in either a coated form or a non-coated form. Materials which can be used to coat these active ingredients include, by way of example, gelatin, mono- and di-glycerides (preferably mono- and di-glycerides of edible fatty acids; e.g., DESCOTET™ or ROCOAT™), stearic acid, a cellulose polymer (e.g. carboxymethylcellulose, methylcellulose, hydroxypropylcellulose, hydroxypropylmethylcellulose, ethylcellulose, etc.), corn protein, cellulose acetate phthalate, or similar coating agents. The choice of coating agent is not critical and the selection of such agents is within the ken of the skilled artisan. One or more vitamins, iron compounds, and minerals can be granulated, using either a wet granulation procedure or a dry granulation procedure, in order to improve their processibility. The vitamins, iron compounds and/or minerals can be agglomerated either separately or in combination to form an agglomerate comprising at least about 25% by weight of a carbohydrate based material, about 1–10% by weight of a water soluble binder, and the remaining weight of the vitamin, iron compound and/or mineral.

The compositions described herein can be made and used in a wide variety of forms, and is preferably a solid dosage form. The solid dosage form is preferably a capsule or compressed tablet. When a tablet form is used, the tablet is preferably coated (e.g. film-coated). The capsule is generally made by mixing the active ingredients (which can be powdered, granulated, coated, agglomerated, or some combination of these) with one or more excipients to form a mixture which is subsequently loaded into the capsule. The capsule is preferably a hard gelatin capsule. The capsule halves are then joined.

The compressed tablet is generally made by mixing the active ingredients (which can be powdered, granulated, coated, agglomerated, or some combination of these) with one or more excipients (e.g. magnesium stearate, microcrystalline cellulose, or a carbohydrate based agglomerate) to form a mixture which is subsequently compressed into a tablet. The tablet is optionally coated. Active ingredients and excipients can be individually granulated, using either a wet or dry granulation process, or two or more of these can be mixed prior to granulation. As is known in the art, granulation of ingredients can improve their handling and processing properties (e.g. tendency to flow, ease of mixing with powders, agglomerates, or other granulated products, etc.).

When the tablet is a chewable tablet, it will preferably comprise a carbohydrate based agglomerate, and it will preferably have an interior that is detectably (e.g., by members of a taste panel or by patients) softer than its exterior. This type of construction in combination with the agglomerate facilitates the rapid dissolution of the tablet in the mouth shortly after it has been chewed. Further, this type of construction reduces the tablet's extent of atmospheric water absorption, i.e. it has reduced hygroscopicity.

The particular combination of iron, vitamins, minerals, and other ingredients in the claimed iron-containing nutritional supplement advantageously provides a product with high nutritional value, high bioavailability, and reduced side effects, relative to prior art nutritional supplements, particularly with respect to those which contain a rapidly dissolving iron compound. The iron supplement of the invention provides a measurable improvement over other known iron supplements in terms of iron release profile and a reduction in the severity or number of side effects, which are typically associated with administration of iron to mammals. Furthermore, as described herein, the nutritional supplement described herein has lower toxicity (i.e. with regard to accidental overdose) than prior art supplements.

The vitamins and other nutritional ingredients can be provided in the amounts and ranges detailed herein, although these amounts and ranges can, of course, be modified as desired. These amounts of non-nutritive components of the compositions can be varied in order to control the final weight of the tablet. For example, the amounts detailed in Example 2 are used to form tablets weighing 1600 milligrams. Of course, instead of making a dosage form consisting of a single 1600 milligram tablet, dosage forms wherein a recommended daily dose consists of two or more tablets can also be made (e.g. a dosage form for which daily administration of two 800 milligram tablets is contemplated).

For example, when a composition described herein is used as a prenatal daily multi-vitamin/mineral supplement, the composition preferably comprises amounts of vitamins and minerals in the following ranges:

(a) about 1–100 milligrams of iron (preferably at least about 15, 30, 45, 60, or 90 milligrams);

(b) about 0.1–2.0 milligrams of folic acid (preferably at least about 1–1.2 milligrams);

(c) about 100–2000 International Units (I.U.) of vitamin A (preferably at least about 1000–1100 I.U.);

(d) about 0.2–8 milligrams of vitamin $B_1$ (preferably at least about 2–2.4 milligrams);

(e) about 0.5–10 milligrams of vitamin $B_2$ (preferably at least about 3–3.45 milligrams);

(f) about 2–50 milligrams of vitamin $B_6$ (preferably at least about 10–12 milligrams);

(g) about 2–20 mocrograms of vitamin $B_{12}$ (perferably at least about 12–14.4 milligrams);

(h) about 20–200 milligrams of vitamin C (preferably at least about 120–132 milligrams);

(i) about 100–800 I.U. of vitamin $D_3$ (preferably at least about 400–440 I.U.);

(j) about 1–50 I.U. of vitamin E (preferably at least about 11–12 I.U.); and (k) about 5–40 milligrams of one of niacin and niacinamide (preferably at least about 20–22 milligrams of niacinamide or an equivalent molar amount of niacin).

One of the advantages of compositions described herein (particularly those which do not comprise a calcium salt) is that tablets which comprise an FDA recommended daily dose of iron, vitamins, and non-ferrous minerals other than calcium can be made significantly smaller than prior art tablets which contain such components. The smaller size that is made possible by this invention is a further advantage that can improve patient compliance with nutritional supplement administration. Because calcium can interfere with iron uptake, absence of calcium from compositions described herein also improves the efficacy of those compositions for providing iron to mammals.

The invention is a pressed solid dosage form including a tablet, capsule, chewable tablet, lozenge, granule or pellet. Preferably, the dosage form is provided as a single or subdivided into several unit doses containing appropriate quantities of the vitamins. The unit dosage form can be a packaged preparation, the package containing discrete quantities of preparation, for example, packeted tablets, lozenges, granules or pellets. The unit dosage form is the tablet, capsule, lozenge, granule or pellet itself or it is an appropriate number of any of these in packaged form. The term "unit dosage form" is used herein to mean a single or multiple dose form containing the described quantities of iron, and optionally of vitamins and minerals, and one or more excipients, the quantity being such that one or more predetermined units are normally required for a single beneficial administration. In the case of multiple dose forms, such as scored tablets, the predetermined unit will be one fraction such as a half or quarter of a scored tablet of the multiple dose form. The specific dose level for any patient will depend upon a variety of factors including the indication being treated, patient health, age, sex, weight, diet, and pharmacological response, and other such factors. The formulation of the present invention can be made in unit doses of less than about 1700 milligrams, particularly including those less than about 1000 milligrams.

For convenience, the total daily dosage may be divided and administered in portions during the day if desired or at one time, morning, afternoon, night as well as biphasic, triphasic, etc. Controlled, delayed (e.g. enteric), and sustained release formulations are within the scope of the invention and, for convenience, are termed "controlled release" formulations.

The components of the solid dosage form are preferably finely divided, i.e. powdered or granulated so as to provide a uniform distribution of ingredients throughout the dosage form. Finely divided components also flow well in tablet presses and other processing machinery, and tend to make tablets having advantageous properties (e.g. chip resistance, homogeneity, etc.). Preferably, not less than about 70% of the finely divided ingredients will pass through a 60 mesh (250 micrometer) screen. In another embodiment, no less than about 80%, even more preferably not less than 90%, of a component will pass through a 50 mesh (300 micrometer) screen.

Materials to be incorporated in the iron supplement can be pretreated to form granules. This process is known as granulation. As commonly defined, "granulation" is any process of size enlargement whereby small particles are gathered together into larger, permanent aggregates to yield a free-flowing composition having a suitable consistency. Such granulated compositions may have consistency similar to that of dry sand. Granulation may be accomplished by agitation in mixing equipment or by compaction, extrusion, or agglomeration. Any wet or dry granulation method known in the art or hereafter developed can be used to granulate the components described herein; the precise method used is not critical. For example, in a dry granulation method, dry ingredients (e.g. a vitamin and an excipient) are blended to uniformly disperse each in the other(s). A granulation agent can be added, to which the dry ingredients adhere. Adherence of the ingredients to the granulation agent generates larger, uniform particles that have advantageous handling properties. In an example of a wet granulation method, dry ingredients are blended to uniformly disperse each in the other(s). A granulating solution (i.e. a binding agent in solution) is added to the blended dry ingredients, and the binding agent binds the ingredients. The mixture is dried and optionally milled. The resulting product comprises particles that also have advantageous handling properties.

Vitamins that have been coated, granulated, or agglomerated individually or in combination can be further coated, agglomerated or granulated prior to being compressed into a solid dosage form.

Elemental iron refers to the iron component of an iron compound. A pharmaceutically acceptable iron compound will be either "slowly dissolving" or "rapidly dissolving". The iron compounds of the invention can be selected from any of the known iron compounds, such as iron (II) (ferrous) salts, iron (III) (ferric) salts, and particulate iron compositions such as carbonyl iron. Examples of iron compounds which are contemplated include ferrous fumarate, ferrous sulfate, ferrous folate, iron dextrans, ferric oxyhydroxide dextran, chitosan derivatives of iron, oligosaccharide derivatives of iron, ferrous acetyl salicylate, ferrous gluconate, ferrous diphosphate, carbonyl iron (iron (0)), ferric orthophosphate, ferrous glycine sulfate, ferrous chloride, ferrous ammonium citrate, ferric ammonium tartrate, ferric phosphate, ferric potassium tartrate, ferric albuminate, ferric cacodylate, ferric hydroxide, ferric pyrophosphate, ferric quinine citrate, ferric valerate, saccharated iron oxide, ferric chloride, ferrous iodide, ferrous nitrate, ferrous glycerophosphate, ferrous formate, amino acid/iron salts, iron salts of protein hydrolysates, ferrous lactate, ferrous tartrate, ferrous succinate, ferrous glutamate, ferrous citrate, ferrous pyrophosphate, ferrous cholinisocitrate, ferrous carbonate, iron-sugar-carboxylate complexes, ferrous sucrate-malate, ferrous sucrate citrate, ferrous fructate-citrate, ferrous sucrate-ascorbate, ferrous fructate-ascorbate, and combinations of these.

Examples of rapidly dissolving iron compounds include ferrous sulfate, ferrous fumarate, ferrous gluconate, ferric ammonium citrate, and iron-protein succinylate. Rapidly dissolving iron compounds have a solubility in water at 25° C. greater than about 1 part in 1000 (i.e. 1 part of the iron compound is soluble in fewer than 1000 parts of water). Preferred examples of rapidly dissolving iron compounds include ferrous sulfate and ferrous fumarate, which can be used interchangeably in many formulations described herein.

Examples of slowly dissolving iron compounds include ferric pyrophosphate and carbonyl iron. Slowly dissolving iron compounds have a solubility in water at 25° C. not less than about 1 part in 1000, preferably not less than about 1 part in 5000 and more preferably, about 1 part in 10,000 (i.e. 1 part of the iron compound is soluble in no fewer than 10,000 parts of water). Use of carbonyl iron is preferred. As is known in the art, carbonyl iron is a small particle preparation of highly purified metallic iron, "carbonyl" merely describing a process by which this compound can be made. It is furthermore recognized that designation of carbonyl iron (i.e. metallic iron) as an iron 'compound' is not in strict conformity with the traditional use of the word compound. Carbonyl iron is nonetheless referred to herein as an iron compound (i.e. a slowly dissolving iron compound).

The rate of dissolution of an iron compound used in the iron supplement will depend upon the salt anion (if any) complexed with the iron, the valence of the iron, and the solution in which the iron compound is dissolved (e.g., water, stomach fluids {acidic}, and fluids from other regions of the gastrointestinal tract, such as intestinal fluids {near neutral pH}).

A "rapidly dissolving" iron compound is an iron compound wherein a known amount of the compound will substantially saturate or completely dissolve in a sufficient volume of saliva or a gastrointestinal fluid in less than about 3 hours, preferably less than about 1 hour. Generally, many iron salts, especially iron (II) salts are considered rapidly dissolving. It will be understood that iron (II) salts having different counter-ions will typically exhibit different dissolution rates.

A composition for rapidly delivering a pharmaceutically acceptable iron compound will generally comprise a rapidly dissolving iron compound.

A "slowly dissolving" iron compound is an iron compound wherein an amount of the compound will substantially completely dissolve in a sufficient volume of saliva or a gastrointestinal fluid in greater than about 3 hours, preferably greater than about 8 hours, more preferably greater than about 12 hours, and even as long as 48 hours (but preferably not greater than 24 hours. Generally, iron (0) (e.g. carbonyl iron) and many iron (III) salts will be "slowly dissolving."

A composition for slowly delivering a pharmaceutically acceptable iron compound can comprise either one or both of a rapidly dissolving iron compound and a slowly dissolving iron compound. Where the composition comprises a rapidly dissolving iron compound, it will need to be provided along with a release rate modifier such that the rapidly dissolving iron compound is dissolved over an extended period of time. A slowly dissolving iron compound need not but can also be provided along with a release rate modifier. It is understood that iron (III) salts having different counterions will typically exhibit different dissolution rates.

The iron compound included in the tablet of the invention will preferably have a particle size less than about 200 micrometers. In one embodiment, the particle size is not greater than about 50 micrometers. The smaller particle size decreases any gritty organoleptic effect in the chewable tablet and increases the bioavailability as well as the rate of dissolution of the iron. When the iron compound is ferrous fumarate, a preparation can be used in which at least about 90% of the ferrous fumarate particles pass through a 100 mesh (150 micrometer) screen. When the iron compound is a coated carbonyl iron, a preparation can be used in which substantially all of the coated iron particles pass through a 40 mesh (425 micrometer) screen. When non-coated carbonyl iron is used, examples of preparations include that available from ISP, in which at least about 90% of particles have a diameter not greater than about 21 micrometers, and that available from BASF, in which the particles have a diameter not greater than about 25 micrometers. The inventor believes that the ISP and BASF carbonyl iron preparations meet FCC (Food Chemicals Codex) specifications. Another useful iron compound is a preparation of FCC carbonyl iron, in which substantially all particles pass through a 200 mesh (75 micrometer) screen.

The ratio of slow release iron composition to rapid release iron composition in an iron supplement according to the invention will be varied as desired to provide different release profiles of iron. For example, the amount of elemental iron in the rapid release iron composition will be greater than the amount of elemental iron in the slow release iron composition in a formulation that is used to rapidly increase the amount of iron in the blood while only providing a minimal sustained and controlled release of iron a period of time after administration of the dosage form. In this case, the rapid release iron composition releases a greater amount of elemental iron than does the slow release iron composition. Conversely, if the desired release profile includes only a minor or moderate initial release of elemental iron followed by a substantial and extended release of elemental iron, the iron supplement will generally comprise a greater amount of elemental iron in the slow iron release composition rather than in the fast release iron composition. In this case, the slow release iron composition releases a greater amount of elemental iron than does the rapid release iron composition.

The precise ratio of slowly dissolving iron compound to rapidly dissolving iron compound in the nutritional supplement described herein is not critical, and can be selected by the skilled artisan as described above. For example, in a nutritional supplement in which a total iron content of 60 milligrams (i.e. on an elemental iron weight basis) is desired, the slowly dissolving iron compound can provide 10, 15, 20, 25, 30, 35, 40, 45, or 50 milligrams of elemental iron, and the rapidly dissolving iron compound can provide the balance of the iron.

The iron supplement of the invention will be able to provide a controlled delivery of elemental iron to a mammal for a period of not less than 3 hours up to about 48 hours, and preferably not less than 8 hours up to about 24 hours. As a result, the iron supplement will increase the amount of iron, ferritin and/or hemoglobin in the blood after administration to a mammal as compared to the amount of iron, ferritin or hemoglobin in the mammal's blood prior to administration of the iron supplement.

The iron compound can be coated with a pharmaceutically acceptable film forming material which permits release of the iron in the gastrointestinal tract of a mammal administered the supplement. Suitable coatings include those described below. The coated iron compound has been found to provide increased iron bioavailability by minimizing interaction between the iron compound and divalent cations, such as calcium, manganese, copper, and magnesium. Release of the iron in the intestine, rather than the stomach, also minimizes side effects such as stomach upset, gastritis, burping and more.

Coating an iron compound, vitamin, or non-ferrous mineral described herein can mask an unpleasant or non-desired taste or odor associated with the component. In addition, coating can also stabilize a component, particularly where the component which can lose its physiological activity, or have such activity decreased or inhibited, upon exposure (particularly prolonged exposure) to an environmental factor such as light, oxygen, or moisture. Coating of unpleasanttasting or -smelling components is contemplated when the nutritional supplement described herein is a chewable or quickly-dissolving composition. When the supplement is a tablet, coating of individual components is generally not necessary, although coating of the tablet can serve to improve the stability, appearance, taste, odor, or handling characteristics of the tablet.

Various forms of extended release particles or coatings along with immediate release particles or coatings can also be combined in the present formulations to deliver the various iron compounds, vitamins and minerals at various rates. For example, certain agents such as thiamine, niacinamide, pyridoxine, ascorbic acid, folic acid, iron and riboflavin could be released over an extended period of time from two hours up to 24 hours while other agents such as beta carotene, vitamin A, vitamin $D_3$, vitamin $B_{12}$, vitamin K, biotin, pantothenic acid, copper, zinc, magnesium, potassium, iodine, manganese, chromium, molybdenum and selenium can be administered in immediate release forms. Formulations having a combination of particles with different release profiles are well known and are prepared according to procedures and techniques known to the artisan of ordinary skill. All types of nutritious minerals can be included in the iron supplement.

If coated, the pressed solid dosage form of the invention comprises a film coating and a compressed solid core. The film coating comprises one or more film forming agents, e.g. combinations of film forming agents are used in some embodiments of the film coating. This combination of film forming agents can provide a formulation having a combined delayed and controlled release of therapeutic agent; however, an immediate release dosage form is preferred. The film coating on the dosage form can also comprise a flavorant and/or colorant, such as a pigment or dye. The coating for the pressed tablet is preferably a rapidly dissolving finish or polish coat comprising a cellulosic polymer, a colorant, a flavorant and a wax.

A preferred form of the iron supplement of the invention comprises vitamins which have an immediate release profile and a combination of iron compound which has a controlled release profile. It will be understood by those of ordinary skill that a "controlled release" dosage form includes dosage forms providing a sustained release, extended release, and timed release. The controlled release iron supplements of the invention preferably provide sustained blood levels of iron, ferritin and/or hemoglobin, which blood levels are higher than they were prior to administration of a first dose of the iron supplement.

If an agglomerate is included within the chewable tablet iron supplement of the invention, it is preferably prepared according to the process of Example 1, which is further described in U.S. Pat. No. 4,684,534 to Valentine. The agglomerate is formed from carbohydrate based material, preferably particles, and a water-soluble binder with or without an active ingredient. An active ingredient and agglomerate are optionally mixed to cause the active ingredient to be entrained by and dispersed in the agglomerate. The agglomerate without the active ingredient generally has a bulk density of from about 40 percent to about 55 percent of the bulk density of the carbohydrate-based particles before they are processed into the agglomerate. The bulk density of the agglomerate itself is relatively low and in the range of from about 0.2 grams per cubic centimeter to about 0.6 grams per cubic centimeter (12.5 pounds per cubic foot to 37.5 pounds per cubic foot). A substantial part of the agglomerate is thought to consist of voids, i.e., pores or ducts, which provide an extremely large surface area capable of entraining and dispersing substantial quantities of active ingredients, ordinarily about 10 percent to about 50 percent by weight of the finished agglomerate (which includes the entrained active ingredient). The agglomerate and entrained active ingredient have particular utility as a direct compression agglomerate from which iron supplements according to the invention can be made, particularly chewable tablets which liquefy in saliva or gastrointestinal juices.

A process for making the carbohydrate-based agglomerate generally comprises the steps of forming a fluidized bed of carbohydrate particles, intermittently spraying a solution of the water soluble binder in a droplet size of from about 20 micrometers to about 100 micrometers into the fluidized bed so as to cause intimate mixing of solution and carbohydrate particles and adhesion together of carbohydrate particles to form agglomerated particles, drying the particles in the fluidized bed between intermittent sprayings, and continuing spraying and drying until the desired amount of solution has been sprayed into the bed. Thereafter, the agglomerated particles are dried to a desired moisture content or the equilibrium moisture content. The amount of liquid binder solution sprayed corresponds to a binder content in the agglomerate of from about 1 percent to about 10 percent by weight of the agglomerate (excluding active ingredient). The carbohydrate-based agglomerate and an active ingredient can be mixed, preferably in a low shear blender, in the following proportion by weight of the finished agglomerate (including active ingredient):agglomerate, about 50 percent to about 90 percent; active ingredient, from about 10 percent to about 50 percent. A lubricant is also mixed together with the agglomerate and the active ingredient in the proportion of from about 0.4 percent to about 1 percent by weight of the finished agglomerate (including active ingredient). Flavors can also be mixed with the agglomerate and active ingredient.

A process for making a chewable tablet iron supplement from the finished carbohydrate-based agglomerates described above including from about 0.4 percent to about 1.0 percent of a lubricant, comprises blending the agglomerate with active ingredients and a lubricant to form a substantially homogeneous mixture, which is placed in a conventional tablet-forming apparatus and compressed to a hardness sufficient to hold the tablet together and substantially destroy the open pore structure of the agglomerate at the surface of the tablet while substantially maintaining the open pore, i.e., large surface area, structure of the agglomerate in the interior of the tablet. Thus, the agglomerate is compressed so that the interior of the tablet retains the essential porous structure and other physical characteristics of the agglomerate which enable it to liquefy quickly when chewed, while the physical characteristics of the agglomerate are changed primarily at the surface of the tablet.

Preferred agglomerates include those comprising the following materials: dextrose monohydrate; dextrose monohydrate and maltodextrin; fructose; dextrose; mannitol; fructose and maltodextrin; sucrose; sucrose and maltodextrin; lactose; lactose and maltodextrin; maltose; maltose and maltodextrin; xylose; xylose and maltodextrin. Aqueous solutions of the following materials can be used as a liquid binder solution: corn syrup solids; dextrose; sucrose; poly (vinylpyrrolidone); cooked starch paste; and combinations of the foregoing, any of which may also include maltodextrin. In such solutions, the maltodextrin binder material preferably has a DE (dextrose equivalence) of less than about 20% and even more preferably in the range of from about 5% to about 12%.

The terms "film forming agent" includes polymeric compounds (of natural, synthetic, semi-synthetic or genetically engineered sources) which will form a film coating around the solid core of the formulation. Some of the film forming agents useful in the invention are further described herein.

The film coating employed can comprise a polymer with a pH dependent solubility which would release a major portion of one or more vitamins and/or minerals in the stomach, ileum, jejunum, small intestine or large intestine a person taking the tablet. The thickness of the film coating can be varied as desired.

The film coating of the present invention is preferably prepared by applying a solution, suspension or emulsion to an existing core or solid and removing the liquid portion to form a substantially dry film. The film coating can comprise one or more of the following: cellulose acetate, ethyl cellulose, wax, EUDRAGIT™ E100, EUDRAGIT™ RS, and EUDRAGIT™ RL, EUDRAGIT™ L, EUDRAGIT™ S, cellulose acetate phthalate, hydroxypropyl methylcellulose phthalate, HPMC acetate succinate, cellulose acetate butyrate, cellulose acetate propionate, cellulose propionate, HPMC, carrageenan, cellulose nitrate, hydrophilic cellulosic agents, hydroxypropylcellulose, methylcellulose, hydroxyethylcellulose, ethylcellulose, polyvinyl acetate and latex dispersions, poly-acids, enteric polymers, polysaccharides, acacia, tragacanth, guar gum, gelatin, proteins, albumin, polylactic acid, biodegradable polymers, polyglutamic acid, carnauba wax, DRI KLEAR™ (Crompton & Knowles, cellulose based polymer dispersion), CHROMAKOTE™ (Crompton & Knowles, pigmented dispersion) and combinations thereof.

The film coating can also comprise poly(ethylene glycol) 3350 (PEG 3350), sorbitol, sucrose, polyols, xylitol, mannitol, carbohydrates, sugars, lactose, maltose, dextrose, water soluble cyclodextrins, urea, fructose, sucrose, mannose; α-hydroxy acids such as citric acid, tartaric acid, fumaric acid, succinic acid, glycolic acid, lactic acid, combinations thereof and their salts; halide counter-ions such as bromide, fluoride, iodide and chloride; divalent metal cations such as magnesium and calcium; anionic agents such as phosphates, sulfates, sulfonates, nitrates, bicarbonates, combinations thereof and their salts; cellulosics such as HPC; poly(ethylene oxide); poly(vinyl pyrrolidone); gums and gelling agents such as xanthan gum, alginic acid, thereof and their salts; clays such as montmorillonite clay, bentonite, Veegum, kaolin clay; miscellaneous ones such as kieselguhr, magnesium silicate, bentone, hectorite, PLURONICS™, hydrophilic surfactants; polyols such as sorbitol, mannitol, xylitol; proteins such as collagen; water soluble amino acids; disintegrants such as starch, sodium starch glycolate, croscarmellose; and water soluble organic compounds; and combinations thereof.

As used in this disclosure, the term "vitamin" refers to trace organic substances that are required in the diet, and more particularly to the vitamins described above. For the purposes of the present invention, the term "vitamin(s)" include, without limitation, cysteine, cystine, thiamine, riboflavin, folic acid, niacinamide, beta carotene, nicotinic acid, pantothenic acid, pyridoxine, biotin, folic acid, cyanocobalamin, vitamin $B_{12}$, vitamin $B_1$, vitamin $B_2$, vitamin $B_3$, vitamin K, vitamin $B_6$, lipoic acid, sodium ascorbate, ascorbic acid, vitamin A, vitamin D, vitamin $D_3$, vitamin C, and vitamin E. Also included within the term "vitamin" are the coenzymes which incorporate a vitamin listed above. Coenzymes are specific chemical forms of vitamins. Coenzymes include thiamine pyrophosphates (TPP), flavin mononucleotide (FMM), flavin adenine dinucleotide (FAD), nicotinamide adenine dinucleotide (AND), nicotinamide adenine dinucleotide phosphate (NADP), coenzyme A (CoA), pyridoxal phosphate, biocytin, tetrahydrofolic acid, coenzyme $B_{12}$, lipoyllysine, 1-cis-retinal, and 1,25-dihydroxycholecalciferol. The term "vitamin(s)" also includes choline, carnitine, and alpha, beta, and gamma carotenes.

As used in this disclosure, the term "mineral" refers to inorganic substances, metals, metal salts and others which are required in the human diet and are known to those of ordinary skill in the art. Thus, the term "mineral" as used herein includes, without limitation, calcium, zinc, selenium, copper, iodine, phosphorus, chromium, molybdenum, manganese, magnesium stearate, magnesium carbonate, magnesium oxide, magnesium hydroxide, and magnesium sulfate. Iron-containing nutritional supplements preferably do not contain calcium, since calcium is known to interfere with or inhibit iron uptake in mammals.

As used with reference to a vitamin or mineral, the term "effective amount" means an amount at least about 10% of the United States R.D.A. of that particular ingredient for a human. For example, if an intended ingredient is vitamin C, then an effective amount of vitamin C would include an amount of vitamin C sufficient to provide 10% or more of the R.D.A. Typically, where the tablet includes a mineral or vitamin, it will incorporate higher amounts, preferably about 100% or more of the applicable R.D.A.

The vitamins and minerals contained within the iron supplement are formulated as their pharmaceutically acceptable salts when necessary. As used herein, "pharmaceutically acceptable salts" refer to derivatives of the disclosed compounds wherein a compound is modified by making an acid or base salts thereof. Examples of pharmaceutically acceptable salts include, but are not limited to, mineral or organic acid salts of basic residues such as amines; alkali or organic salts of acidic residues such as carboxylic acids; and others known to those of ordinary skill in the art. The pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfonic, sulfamic, phosphoric, nitric and others known to those of ordinary skill in the art; and the salts prepared from organic acids such as amino acids, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and others known to those of ordinary skill in the art. The pharmaceutically acceptable salts of these compounds are available from well known commercial sources.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The dosage form of the invention can contain any of a variety of hydrophobic or hydrophilic binders. Examples of suitable hydrophobic binders include cellulose acetate butyrate, cellulose acetate propionate, cellulose propionate high molecular weight (200,000), cellulose propionate medium molecular weight (75,000), cellulose propionate low molecular weight (25,000), cellulose acetate, cellulose nitrate, ethylcellulose, polyvinyl acetate, and others known to those of ordinary skill in the art. Examples of suitable hydrophilic binders include poly(vinylpyrrolidone), vinyl alcohol polymer, polyethylene oxide, water soluble or water swellable cellulose and starch derivatives and others known to those of ordinary skill in the art.

Examples of other binders which can be added to the formulation include, for example, acacia, tragacanth, gelatin, starch, cellulose materials such as methyl cellulose and sodium carboxymethyl cellulose, alginic acids and salts thereof, polyethylene glycol, guar gum, polysaccharide, sugars, invert sugars, poloxomers (PLURONIC™ F68, PLURONIC™ F127), collagen, albumin, gelatin, cellulosics in non-aqueous solvents, pre-gelatinized starch, starch paste and combinations of the above. Other binders include, for example, polypropylene glycol, polyoxyethylene-polypropylene copolymer, polyethylene ester, polyethylene glycol, polyethylene sorbitan ester, polyethylene oxide or combinations thereof and others known to those of ordinary skill in the art.

One or more excipients are included in the chewable tablet of the invention. An excipient includes, without limitation, an acidifying agent, alkalinizing agent, adsorbent, antifungal preservative, antioxidant, buffering agent, colorant, disintegrant, encapsulating agent, flavorant, hygroscopic agent, plasticizer, stiffening agent, sweetening agent, tablet anti-adherent, tablet binder, tablet and capsule diluent, tablet coating agent, tablet direct compression excipient, tablet disintegrant, tablet glidant, tablet lubricant, tablet/capsule opaquant and tablet polishing agent.

As used herein, the term "acidifying agent" means a compound used to provide acidic medium for product stability. Such compounds include, by way of example and without limitation, acetic acid, citric acid, fumaric acid, hydrochloric acid, and nitric acid and others known to those of ordinary skill in the art.

As used herein, the term "alkalinizing agent" means a compound used to provide alkaline medium for product stability. Such compounds include, by way of example and without limitation, ammonia solution, ammonium carbonate, diethanolamine, monoethanolamine, potassium hydroxide, sodium borate, sodium carbonate, sodium hydroxide, triethanolamine, and trolamine and others known to those of ordinary skill in the art.

As used herein, the term "adsorbent" means an agent capable of holding other molecules onto its surface by physical or chemical (chemisorption) means. Such compounds include, by way of example and without limitation, powdered and activated charcoal and others known to those of ordinary skill in the art.

Disintegrants include materials which aid in the disintegration and/or dissolution of the iron supplements and/or its ingredients. Disintegrants include starches such as corn starch, potato starch, pre-gelatinized and modified starches thereof, cellulosic agents such as Ac-di-sol, montmorrilonite clays, cross-linked PVP, sweeteners, bentonite, VEEGUM™, microcrystalline cellulose, alginates, sodium starch glycolate, gums such as agar, guar, locust bean, karaya, pectin and tragacanth.

Plasticizers may be required in the solid dosage form of the invention. Such plasticizers can include, by way of example and without limitation, low molecular weight polymers, oligomers, copolymers, oils, small organic molecules, low molecular weight polyols having aliphatic hydroxyls, ester-type plasticizers, glycol ethers, poly (propylene glycol), multi-block polymers, single block polymers, low molecular weight poly(ethylene glycol), citrate esters, triacetin, propylene glycol phthalate esters, phosphate esters, sebacate esters, glycol derivatives, fatty acid esters, glycerin, ethylene glycol, 1,2-butylene glycol, 2,3-butylene glycol, styrene glycol, diethylene glycol, dipropylene glycol, triethylene glycol, tetraethylene glycol and other poly(ethylene glycol) compounds, monopropylene glycol monoisopropyl ether, propylene glycol monoethyl ether, ethylene glycol monoethyl ether, diethylene glycol monoethyl ether, sorbitol lactate, ethyl lactate, butyl lactate, ethyl glycolate, dibutylsebacate, dimethylsebacate, di-2-ethylhexylsebacate, tricresyl phosphate, triethyl phosphate, triphenyl phosphate, acetylated monoglycerides, mineral oil, castor oil, glyceryl triacetate, butyl stearate, glycerol monostearate, butoxyethyl stearate, stearyl alcohol, cyclohexyl ethyl phthalate, cyclohexyl methyl dibutylphthalate, diethyl phthalate, dibutyl phthalate, diisopropyl phthalate, dimethyl phthalate, dioctyl phthalate, acetyl tributyl citrate, triethyl citrate, acetyl triethyl citrate, tributyl citrate, allyl glycolate and combinations thereof. All such plasticizers are commercially available from sources such as Aldrich or Sigma Chemical Co. or Morflex, Inc.

These formulations can also contain hygroscopic agents which can draw water into an iron supplement. Such hygroscopic agents can include water soluble electrolytes, small organic compounds, osmotic adjusting agents to increase the osmotic pressure within a dosage form and attract water.

As used herein, the term "preservative" means a compound used to prevent the growth of microorganisms or prevent the degradation of one or more active ingredients. Such compounds include, by way of example and without limitation, benzalkonium chloride, benzethonium chloride, benzyl alcohol, cetylpyridinium chloride, chlorobutanol, phenol, phenylethyl alcohol, phenylmercuric nitrate and thimerosal and others known to those of ordinary skill in the art.

As used herein, the term "antioxidant" means an agent which inhibits oxidation and thus is used to prevent the deterioration of preparations by the oxidative process. Such compounds include, by way of example and without limitation, ascorbic acid, ascorbyl palmitate, butylated hydroxyanisole, butylated hydroxytoluene, hypophophorous acid, monothioglycerol, propyl gallate, sodium ascorbate, sodium bisulfite, sodium formaldehyde sulfoxylate and sodium metabisulfite and others known to those of ordinary skill in the art.

As used herein, the term "buffering agent" means a compound used to resist change in pH upon dilution or addition of acid or alkali. Such compounds include, by way of example and without limitation, potassium metaphosphate, potassium phosphate, monobasic sodium acetate and sodium citrate anhydrous and dihydrate and others known to those of ordinary skill in the art.

As used herein, the term "colorant" means a compound used to impart color to solid (e.g., tablets and capsules) pharmaceutical preparations. Such compounds include, by way of example and without limitation, FD&C Red No. 3, FD&C Red No. 20, FD&C Yellow No. 6, FD&C Blue No. 2, D&C Green No. 5, FD&C Orange No. 5, D&C Red No. 8, caramel, and ferric oxide, red and others known to those of ordinary skill in the art. Coloring agents can also include pigments, dyes, tints, titanium dioxide, natural coloring agents such as grape skin extract, beet red powder, beta carotene, annato, carmine, turmeric, paprika, CHROMA-KOTE™ and others known to those of ordinary skill in the art.

As used herein, the term "flavorant" means a natural or artificial compound, or some combination of these, used to impart a pleasant flavor and often odor to a pharmaceutical preparation. Flavors incorporated in the composition may be chosen from natural and synthetic flavor oils and flavoring aromatics and/or natural oils, extracts from plants, leaves, flowers, fruits, and combinations thereof. Such compounds include, by way of example and without limitation, anise oil, cinnamon oil, vanilla, vanillin, cocoa, chocolate, menthol, grape, peppermint oil, oil of wintergreen, clove oil, bay oil, anise oil, eucalyptus, thyme oil, cedar leave oil, oil of nutmeg, oil of sage, oil of bitter almonds, cassia oil; citrus oils such as lemon, orange, lime and grapefruit oils; and fruit essences, including berry, apple, pear, peach, date, blueberry, kiwi, strawberry, raspberry, wildberry, cherry, plum, pineapple, and apricot. All of these flavorants are commercially available. Preferred flavorants include vanillin and berry. The amount of flavoring may depend on a number of factors, including the organoleptic effect desired.

As used herein, the term "sweetening agent" means a compound used to impart sweetness to a preparation. Such compounds include, by way of example and without limitation, aspartame, dextrose, glycerin, mannitol, saccharin sodium, sorbitol, sucrose high fructose corn syrup, fructose oligosaccharides, and others known to those of ordinary skill in the art.

As used herein, the term "tablet anti-adherents" means agents which prevent the sticking of iron supplement ingredients to punches and dies in a tabletting machine during production. Such compounds include, by way of example and without limitation, magnesium stearate, corn starch, silicone dioxide, talc and others known to those of ordinary skill in the art.

As used herein, the term "tablet binders" means substances used to cause adhesion of powder particles in tablet granulations. Such compounds include, by way of example and without limitation, acacia, alginic acid, carboxymethylcellulose sodium, compressible sugar (e.g., NUTAB™), ethylcellulose, gelatin, liquid glucose, methylcellulose, povidone, pre-gelatinized starch, those described above and others known to those of ordinary skill in the art.

As used herein, the term "tablet and capsule diluent" means inert substances used as fillers to create the desired bulk, flow properties, and compression characteristics in the preparation of tablets and capsules. Such compounds include, by way of example and without limitation, dibasic calcium phosphate, kaolin clay, fructose, sucrose, dextrose, lactose, mannitol, microcrystalline cellulose, powdered cellulose, precipitated calcium carbonate, sorbitol, calcium sulfate, starch and others known to those of ordinary skill in the art.

As used herein, the term "coating agent" means a compound used to coat a formed iron supplement for the purpose of protecting against active ingredient decomposition by atmospheric oxygen or humidity, to provide a desired release pattern for the active ingredient after administration, to mask the taste or odor of the active ingredient substance, or for aesthetic purposes. The coating may be of various types, including sugar coating, film coating, or enteric coating. Sugar coating is water-based and results in a thickened covering around a formed tablet. Sugar-coated tablets generally dissolve at the higher pH values of the intestines. A film coat is a thin cover around a formed tablet or bead. Unless it is an enteric coat, the film coat will dissolve in the stomach. An enteric coated tablet or bead will pass through the stomach and break up in the intestines. Film coatings such as those described above are included within this definition.

As used herein, the term "direct compression excipient" means a compound used in direct compression tablet formulations. Such compounds include, by way of example and without limitation, dibasic calcium phosphate (e.g., DITAB™), spray dried, or anhydrous lactose, microcrystalline cellulose, (AVICEL™), dextran (EMDEX™), sucrose (NUTAB™) and others known to those of ordinary skill in the art.

As used herein, the term "glidant" means agents used in tablet and capsule formulations to reduce friction during tablet compression. Such compounds include, by way of example and without limitation, colloidal or fumed silica, magnesium stearate, cornstarch, and talc and others known to those of ordinary skill in the art.

As used herein, the term "lubricant" means substances used in tablet formulations to reduce friction during tablet compression. Such compounds include, by way of example and without limitation, calcium stearate, magnesium stearate, mineral oil, stearic acid, hydrogenated vegetable oil, benzoic acid, poly(ethylene glycol), NaCl, PRUV™, zinc stearate and others known to those of ordinary skill in the art.

As used herein, the term "tablet/capsule opaquant" means a compound used to render a capsule or a tablet coating opaque. Opaquants can be used alone or in combination with a colorant. Such compounds include, by way of example and without limitation, titanium dioxide and others known to those of ordinary skill in the art.

As used herein, the term "polishing agent" means a compound used to impart an attractive sheen to coated tablets. Such compounds include, by way of example and without limitation, camauba wax, and white wax and others known to those of ordinary skill in the art.

The iron supplement of the invention can be used to treat or prevent an iron deficiency related disease or disorder in a mammal. One or more of the iron supplements are administered to the mammal for a period of time sufficient or in an amount sufficient to maintain therapeutic, i.e., normal or healthy, levels of at least one of iron, hemoglobin and ferritin in the mammal's blood.

The foregoing will be better understood with reference to the following examples which detail certain procedures for the preparation of formulations according to the present invention. All references made to these examples are for the purposes of illustration. They are not to be considered limiting as to the scope and nature of the present invention.

EXAMPLE 1

Preparation of Agglomerate

The carbohydrate-based agglomerate used in the chewable tablet was made according to the procedure described in U.S. Pat. No. 4,684,534 to Valentine which is hereby incorporated by reference in its entirety.

EXAMPLE 2

Preparation of a Chewable Iron Supplement Tablet

The following ingredients were obtained in the quantities indicated.

(a) 100 milligrams of folic acid (USP)
(b) 40,000 I.U. of vitamin $D_3$ (100,000 I.U. per gram);
(c) 100,000 I.U. of beta carotene (333,333 I.U. per gram; 10% cold water soluble or 10% dilution);
(d) 200 milligrams of vitamin $B_1$ (33% by weight coated with DESCOTE™);
(e) 300 milligrams of vitamin $B_2$ (33% by weight coated with DESCOTE™);

(f) 1,000 milligrams of vitamin $B_6$ (33% by weight coated with DESCOTE™);
(g) 1,200 micrograms of vitamin $B_{12}$ (0.1% triturate in modified starch);
(h) 1,100 I.U. of vitamin E acetate (50%);
(i) 12,000 milligrams of vitamin C (7,340 milligrams as sodium ascorbate (USP/FCC) and 4,660 milligrams as ascorbic acid (USP/FCC)
(j) 2,000 milligrams of niacinamide (33.3% by weight coated with DESCOTE™);
(k) 2,500 milligrams iron as ferrous fumarate (32.87% Fe, USP);
(l) 111,552 milligrams of dextrose agglomerate;
(m) 4,000 milligrams of simethicone;
(n) 1,500 milligrams of magnesium stearate;
(o) 1,600 milligrams of tricalcium phosphate;
(p) 600 milligrams of artificial berry flavor; and
(q) 3500 milligrams of carbonyl iron (99.9% by weight Fe).

The ingredients (a) through (k) and (q) were mixed to form an active ingredient mixture premix. The ingredients (l), (m) and (p) were mixed to form an excipient mixture, and the active ingredient mixture was added thereto to form a blend. The ingredients (o) and (n) were added to the blend with mixing to form a multivitamin composition, which was compressed to make one hundred 1,600 milligram chewable tablets.

EXAMPLE 3

Preparation of a Non-chewable Iron Supplement Tablet

The following ingredients were obtained in the quantities indicated to make one hundred 780 mg tablets.
(a) 100 milligrams of folic acid (USP)
(b) 40,000 I.U. of vitamin $D_3$ (100,000 I.U. per gram);
(c) 100,000 I.U. of beta carotene (333,333 I.U. per gram; 10% cold water soluble or 10% dilution);
(d) 200 milligrams of vitamin $B_1$ (33% by weight coated with DESCOTE™);
(e) 300 milligrams of vitamin $B_2$ (33% by weight coated with DESCOTE™);
(f) 1,000 milligrams of vitamin $B_6$ (33% by weight coated with DESCOTE™);
(g) 1,200 micrograms of vitamin $B_{12}$ (1% triturate in modified starch);
(h) 1,100 I.U. of vitamin E acetate (50%);
(i) 12,000 milligrams of vitamin C (ascorbic acid USP/FCC))
(j) 2,000 milligrams of niacinamide
(k) 2,500 milligrams of iron as ferrous sulfate (36.77% Fe, USP)
(l) 3,500 milligrams of carbonyl iron (99.9% by weight Fe).
(m) 4,140 milligrams of pre-gelatinized starch;
(n) 26,000 milligrams of lactose monohydrate;
(o) 500 milligrams of magnesium stearate;
(p) 2,500 milligrams of sodium starch glycolate;
(q) 5,000 milligrams of microcrystalline cellulose;
(r) 500 milligrams of stearic acid;
(s) 15 milligrams of carnauba wax;
(t) 1,400 milligrams of DRI KLEAR™;
(u) 750 milligrams of CHROMAKOTE™; and
(v) 25 milligrams of vanillin;

The ingredients (a) through (l) were mixed to form a premix. The ingredients (m), (n), (p) and (q) were mixed, and the premix was added thereto to form a blend. The ingredients (o) and (r) were added to the blend with mixing to form an iron supplement powder. The powder was then compressed into one hundred tablets. The ingredients (t)–(v) were mixed and sprayed onto the tablets to form a finish coat surrounding the tablet. The finish coat was then polished with ingredient (s), and the final tablets were printed and packaged.

EXAMPLE 4

Preparation of a Coated Iron Supplement Tablet

The following ingredients were incorporated, as described herein, into individual coated iron-containing nutritional supplement tablets in the quantities indicated.

Active Ingredients
(a) 1.2 milligrams of folic acid (USP)
(b) 442.5 I.U. of vitamin $D_3$ (0.52 milligrams of vitamin $D_3$ beadlets; 850,000 I.U. per gram);
(c) 1100 I.U. of vitamin A (0.99 milligrams (330 I.U.) of beta carotene beadlets 20%; 333,333 I.U. per gram; 1.54 milligrams (770 I.U.) of vitamin A acetate; 500,000 I.U. per gram);
(d) 2.4 milligrams of vitamin $B_1$ (thiamine mononitrate, USP);
(e) 3.45 milligrams of vitamin $B_2$ (riboflavin, USP);
(f) 12 milligrams of vitamin $B_6$ (pyridoxine hydrochloride, USP);
(g) 1.2 micrograms of vitamin $B_{12}$ (1.44 milligrams of a 1% triturate);
(h) 12 I.U. of vitamin E (23.1 milligrams of vitamin E acetate 50% SD);
(i) 132 milligrams of vitamin C (ascorbic acid, USP)
(j) 22 milligrams of niacinamide (USP);
(k) 71.4 milligrams of ferrous sulfate (36.77% Fe=26.24 milligrams Fe);
(l) 36.75 milligrams of carbonyl iron.

Excipients
(m) 41.4 milligrams of pre-gelatinized starch;
(n) 260 milligrams of lactose monohydrate;
(o) 5 milligrams of magnesium stearate;
(p) 25 milligrams of sodium starch glycolate;
(q) 50 milligrams of microcrystalline cellulose;
(r) 5 milligrams of stearic acid.

Film coat
(s) 0.15 milligram of carnauba wax;
(t) 14 milligrams of DRI KLEAR™;
(u) 7.5 milligrams of CHROMAKOTE™ (white); and
(v) 0.25 milligram of vanillin;

EXAMPLE 5

Preparation of a Coated Iron Supplement Tablet

The following ingredients were incorporated, as described herein, into individual coated iron-containing nutritional supplement tablets in the quantities indicated.

Active Ingredients
- (a) 1.2 milligrams of folic acid (USP)
- (b) 442.5 I.U. of vitamin $D_3$ (0.52 milligrams of vitamin $D_3$ beadlets; 850,000 I.U. per gram);
- (c) 1100 I.U. of vitamin A (0.99 milligrams (330 I.U.) of beta carotene beadlets 20%; 333,333 I.U. per gram; 1.54 milligrams (770 I.U.) of vitamin A acetate; 500,000 I.U. per gram);
- (d) 2.4 milligrams of vitamin $B_1$ (thiamine mononitrate, USP);
- (e) 3.45 milligrams of vitamin $B_2$ (riboflavin, USP);
- (f) 12 milligrams of vitamin $B_6$ (pyridoxine hydrochloride, USP);
- (g) 1.2 micrograms of vitamin $B_{12}$ (1.44 milligrams of a 1% triturate);
- (h) 12 I.U. of vitamin E (23.1 milligrams of vitamin E acetate 50% SD);
- (i) 132 milligrams of vitamin C (ascorbic acid, USP)
- (j) 22 milligrams of niacinamide (USP);
- (k) 71.4 milligrams of ferrous sulfate (36.77% Fe=26.24 milligrams Fe);
- (l) 36.75 milligrams of carbonyl iron.

Excipients
- (m) 37 milligrams of pre-gelatinized starch (obtained from Colorcon);
- (n) 169.21 milligrams of lactose monohydrate (obtained from Formost);
- (o) 5 milligrams of magnesium stearate (obtained from Mallinckrodt);
- (p) 25 milligrams of sodium starch glycolate (obtained from Avebe);
- (q) 100 milligrams of microcrystalline cellulose (obtained from Degussa);
- (r) 5 milligrams of stearic acid (obtained from Sergeant).

Film coat
- (s) 0.15 milligram of carnauba wax (obtained from Ross wax);
- (t) 30 milligrams of OPADRY YS-1-7003 white (obtained from Colorcon); and
- (u) 0.35 milligram of vanillin (obtained from Hansen);

The above is a detailed description of particular embodiments of the invention. Those of ordinary skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. A nutritional supplement for a human, the supplement comprising folic acid, a first pharmaceutically acceptable iron compound selected to be slowly dissolving and a second, different pharmaceutically acceptable iron compound selected to be rapidly dissolving.

2. The nutritional supplement of claim 1, further comprising at least one of a vitamin and a non-ferrous mineral.

3. The nutritional supplement of claim 1, wherein a daily dose of the supplement comprises at least about 1 milligram of folic acid.

4. The nutritional supplement of claim 3, wherein the dose comprises at least about 15 milligrams of iron.

5. The nutritional supplement of claim 4, wherein the dose comprises at least about 45 milligrams of iron.

6. The nutritional supplement of claim 5, wherein the dose comprises at least about 60 milligrams of iron.

7. The nutritional supplement of claim 6, wherein the dose comprises at least about 90 milligrams of iron.

8. The nutritional supplement of claim 2, wherein the supplement comprises vitamin A, vitamin $B_1$, vitamin $B_2$, vitamin $B_6$, vitamin $B_{12}$, vitamin C, vitamin $D_3$, vitamin E, and at least one of niacin and niacinamide.

9. The nutritional supplement of claim 8, wherein the supplement comprises
- (a) about 1–100 milligrams of iron;
- (b) about 0.1–2.0 milligrams of folic acid;
- (c) about 100–4000 International Units (I.U.) of vitamin A;
- (d) about 0.2–8 milligrams of vitamin $B_1$;
- (e) about 0.5–10 milligrams of vitamin $B_2$;
- (f) about 2–50 milligrams of vitamin $B_6$;
- (g) about 2–20 micrograms of vitamin $B_{12}$;
- (h) about 20–200 milligrams of vitamin C;
- (i) about 100–800 I.U. of vitamin $D_3$;
- (j) about 1–200 I.U. of vitamin E; and
- (k) about 5–40 milligrams of at least one of niacin and niacinamide.

10. The nutritional supplement of claim 9, wherein the supplement comprises
- (a) at least about 15 milligrams of iron;
- (b) at least aboutmilligrams of folic acid;
- (c) at least about 1000 International Units (I.U.) of vitamin A;
- (d) at least about 2 milligrams of vitamin $B_1$;
- (e) at least about 3 milligrams of vitamin $B_2$;
- (f) at least about 10 milligrams of vitamin $B_6$;
- (g) at least about 12 micrograms of vitamin $B_{12}$;
- (h) at least about 120 milligrams of vitamin C;
- (i) at least about 400 I.U. of vitamin $D_3$;
- (j) at least about 11 I.U. of vitamin E; and
- (k) at least about 20 milligrams of niacinamide.

11. The nutritional supplement of claim 9, wherein the supplement comprises
- (a) about 63 milligrams of iron;
- (b) about 1.2 milligrams of folic acid;
- (c) about 1100 International Units (I.U.) of vitamin A;
- (d) about 2.4 milligrams of vitamin $B_1$;
- (e) about 3.45 milligrams of vitamin $B_2$;
- (f) about 12 milligrams of vitamin $B_6$;
- (g) about 14.4 micrograms of vitamin $B_{12}$;
- (h) about 132 milligrams of vitamin C;
- (i) about 440 I.U. of vitamin $D_3$;
- (j) about 12 I.U. of vitamin E; and
- (k) about 22 milligrams of niacinamide.

12. The nutritional supplement of claim 9, wherein the supplement comprises
- (a) the iron in the supplement comprises ferrous sulfate and carbonyl iron;
- (c) the vitamin A in the supplement comprises beta carotene and vitamin A acetate;
- (d) the vitamin $B_1$ in the supplement comprises thiamine mononitrate;

(f) the vitamin B$_6$ in the supplement comprises pyridoxine hydrochloride;
(h) the vitamin C in the supplement comprises ascorbic acid; and
(j) the vitamin E in the supplement comprises vitamin E acetate.

13. The nutritional supplement of claim 1, wherein the supplement is in a solid dosage form.

14. The nutritional supplement of claim 13, wherein the solid dosage form is selected from the group consisting of a tablet, a capsule, a caplet, a granule, a particulate, an agglomerate, a spansule, a powder, and a chewable tablet.

15. The nutritional supplement of claim 1, wherein the rapidly dissolving iron compound is selected from the group consisting an iron (II) salt and an iron (III) salt.

16. The nutritional supplement of claim 1, wherein the slowly dissolving iron compound is selected from the group consisting of carbonyl iron, an iron (II) salt, and an iron (III) salt.

17. The nutritional supplement of claim 1, wherein each of the iron compounds is independently selected from the group consisting of ferrous fumarate, ferrous sulfate, ferrous folate, an iron dextran, ferric oxyhydroxide dextran, a chitosan derivative of iron, an oligosaccharide derivative of iron, ferrous acetyl salicylate, ferrous gluconate, ferrous diphosphate, carbonyl iron, ferric orthophosphate, ferrous glycine sulfate, ferrous chloride, ferrous ammonium citrate, ferric ammonium citrate, ferric ammonium tartrate, ferric phosphate, ferric potassium tartrate, ferric albuminate, ferric cacodylate, ferric hydroxide, ferric pyrophosphate, ferric quinine citrate, ferric valerate, saccharated iron oxide, iron oxide, ferric chloride, ferrous iodide, ferrous nitrate, ferrous glycerophosphate, ferrous formate, an amino acid and iron salt, an iron salt of a protein hydrolysate, ferrous lactate, ferrous tartrate, ferrous succinate, ferrous glutamate, ferrous citrate, ferrous pyrophosphate, ferrous cholinisocitrate, ferrous carbonate, an iron-sugar-carboxylate complex, ferrous sucrate-malate, ferrous sucrate citrate, ferrous fructate-citrate, ferrous sucrate-ascorbate, and ferrous fructate-ascorbate.

18. The nutritional supplement of claim 17, wherein the rapidly dissolving iron compound is selected from the group consisting of ferrous sulfate and ferrous fumarate.

19. A nutritional supplement for a human, the supplement comprising a first pharmaceutically acceptable iron compound selected to be slowly dissolving and a second, different pharmaceutically acceptable iron compound selected to be rapidly dissolving, wherein the rapidly dissolving iron compound is selected from the group consisting of ferrous sulfate and ferrous fumarate and the slowly dissolving iron compound is carbonyl iron.

20. The nutritional supplement of claim 1, wherein the supplement contains less than a therapeutically effective amount of calcium.

21. The nutritional supplement of claim 1, wherein the supplement contains less than a therapeutically effective amount of calcium.

22. A nutritional supplement for a human, the supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the slowly dissolving iron compound is greater than the amount of elemental iron which is present in the supplement in the form of the rapidly dissolving iron compound.

23. The nutritional supplement of claim 1, wherein the amount of elemental iron which is present in the supplement in the form of the rapidly dissolving iron compound is greater than the amount of elemental iron which is present in the supplement in the form of the slowly dissolving iron compound.

24. A nutritional supplement for a human, the supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the rapidly dissolving iron compound is approximately equal to the amount of elemental iron which is present in the supplement in the form of the slowly dissolving iron compound.

25. A nutritional supplement for a human, the supplement comprising a first pharmaceutically acceptable iron compound selected to be slowly dissolving and a second, different pharmaceutically acceptable iron compound selected to be rapidly dissolving, wherein substantially all of the rapidly dissolving iron compound dissolves in less than 3 hours following oral administration of the supplement to a human.

26. A nutritional supplement for a human, the supplement comprising a first pharmaceutically acceptable iron compound selected to be slowly dissolving and a second, different pharmaceutically acceptable iron compound selected to be rapidly dissolving, wherein less than substantially all of the slowly dissolving iron compound dissolves within about 3 hours following oral administration of the supplement to a human, and wherein substantially all of the slowly dissolving iron compound dissolves in less than about 48 hours following oral administration of the supplement to a human.

27. The nutritional supplement for a human, the supplement comprising a first pharmaceutically acceptable iron compound selected to be slowly dissolving and a second, different pharmaceutically acceptable iron compound selected to be rapidly dissolving, wherein the supplement is a chewable dosage form comprising at least one agglomerate comprising at least about 25% by weight of a carbohydrate based material and about 1–10% by weight of a water soluble binder.

28. The nutritional supplement of claim 27, wherein the agglomerate comprises 90–99% by weight of a carbohydrate based material selected from the group consisting of dextrose, dextrose monohydrate, maltodextrin, fructose, sucrose, lactose, maltose, mannitol and xylose, and wherein the binder is selected from the group consisting of maltodextrin, corn syrup solids, dextrose, sucrose, poly (vinylpyrrolidone), and cooked starch paste.

29. The nutritional supplement of claim 27, wherein the dosage form has an interior that is softer than its exterior, and wherein the dosage form dissolves rapidly in the mouth when it is chewed.

30. A method of alleviating an iron deficiency related disease or disorder in a human, the method comprising administering the nutritional supplement of claim 1 to the human.

31. The method of claim 30, wherein the human is a female selected from the group consisting of a pregnant woman, a woman who anticipates becoming pregnant, and a woman who is nursing an infant.

32. The method of claim 31, wherein the disease or disorder is anemia.

33. A method of alleviating an iron deficiency related disease or disorder in a lactating female human, the method comprising administering a nutritional supplement to the lactating female human, wherein the supplement comprises a first pharmaceutically acceptable iron compound selected to be slowly dissolving and a second, different pharmaceutically acceptable iron compound selected to be rapidly dissolving.

34. A method of alleviating a nutritional disease or disorder in a human fetus, the method comprising administering a nutritional supplement to the human within whom the fetus is developing, wherein the supplement comprises a first pharmaceutically acceptable iron compound selected to be slowly dissolving and a second, different pharmaceutically acceptable iron compound selected to be rapidly dissolving.

35. The method of claim 34, wherein the disease or disorder is selected from the group consisting of a birth defect and low birth weight.

36. A method of alleviating a nutritional disease or disorder in a human infant, the method comprising administering the nutritional supplement to a human female who is nursing the infant, wherein the supplement comprises a first pharmaceutically acceptable iron compound selected to be slowly dissolving and a second, different pharmaceutically acceptable iron compound selected to be rapidly dissolving.

37. The method of claim 36, wherein the disease or disorder is anemia.

38. A method of alleviating iron deficiency in a human, the method comprising administering to the human a nutritional supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the slowly dissolving iron compound is greater than the amount of elemental iron which is present in the supplement in the form of the rapidly dissolving iron compound.

39. The nutritional supplement of claim 22, wherein more than ½ to about ⅔ of the elemental iron is in the form of the slowly dissolving iron compound.

40. A nutritional supplement for a human, the supplement comprising a first pharmaceutically acceptable iron compound selected to be slowly dissolving and a second, different pharmaceutically acceptable iron compound selected to be rapidly dissolving, wherein the supplement provides a controlled release of the iron absent a release rate modifier.

41. A method of alleviating iron deficiency in a human, the method comprising administering to the human a nutritional supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the slowly dissolving iron compound is greater than the amount of elemental iron which is present in the supplement in the form of the rapidly dissolving iron compound, and wherein the supplement provides a controlled release of the iron absent a release rate modifier.

42. A method of making a nutritional supplement, the method comprising combining a first pharmaceutically acceptable iron compound selected to be slowly dissolving, a second, different pharmaceutically acceptable iron compound selected to be rapidly dissolving, and a pharmaceutically acceptable excipient, wherein the supplement provides a controlled release of the iron absent a release rate modifier.

43. A nutritional supplement for a human comprising:
    (a) a slowly dissolving iron compound that is carbonyl iron; and
    (b) a rapidly dissolving iron compound that is selected from the group consisting of ferrous fumarate and ferrous sulfate,
wherein the nutritional supplement is in a solid dosage form selected from the group consisting of a tablet, capsule, caplet, chewable tablet, lozenge and troche.

44. The nutritional supplement according to claim 43, wherein a greater amount of elemental iron in the supplement is in the slowly dissolving iron compound than in the rapidly dissolving iron compound.

45. The nutritional supplement according to claim 44, wherein the supplement further comprises folic acid.

46. The nutritional supplement according to claim 45, wherein the solid dosage form is a tablet that is suitable for administering to a woman during pregnancy.

47. The nutritional supplement according to claim 46, wherein the weight ratio of elemental iron in the slowly dissolving iron compound to elemental iron in the rapidly dissolving compound is 1:4:1.

48. The nutritional supplement according to claim 47, wherein the tablet comprises:
    (a) 1.0 milligram of folic acid;
    (b) 25 milligrams of elemental iron in the rapidly dissolving iron compound; and
    (c) 35 milligrams of elemental iron in the slowly dissolving iron compound.

49. The nutritional supplement according to claim 48, wherein the rapidly dissolving iron compound is ferrous sulfate.

50. A method of treating or preventing an iron deficiency related disease or disorder in a human, the method comprising orally administering to the human a nutritional supplement comprising:
    (a) a slowly dissolving iron compound that is carbonyl iron; and
    (b) a rapidly dissolving iron compound that is selected from the group consisting of ferrous fumarate and ferrous sulfate,
wherein said nutritional supplement is in a solid dosage form selected from the group consisting of a tablet, capsule, caplet, chewable tablet, lozenge and troche.

51. The method according to claim 50, wherein a greater amount of elemental iron in the supplement is in the slowly dissolving iron compound than in the rapidly dissolving iron compound.

52. The method according to claim 51, wherein the supplement further comprises folic acid.

53. The method according to claim 52, wherein the solid dosage form is a tablet that is suitable for administration to a woman during pregnancy.

54. The method according to claim 53, wherein the weight ratio of elemental iron in the slowly dissolving iron compound to elemental iron in the rapidly dissolving iron compound is 1:4:1.

55. The method according to claim 54, wherein the tablet comprises:
    (a) 1.0 milligrams of folic acid;
    (b) 25 milligrams of elemental iron in the rapidly dissolving iron compound; and
    (c) 35 milligrams of elemental iron in the slowly dissolving iron compound.

56. The method according to claim 55, wherein the rapidly dissolving iron compound is ferrous sulfate.

* * * * *

UNITED STATES PATENT AND TRADEMARK OFFICE
CERTIFICATE OF CORRECTION

PATENT NO. : 6,521,247 B1
DATED : February 18, 2003
INVENTOR(S) : Tina deVries

It is certified that error appears in the above-identified patent and that said Letters Patent is hereby corrected as shown below:

Column 3,
Line 43, "1-1000" should read -- 1-100 --.

Column 4,
Line 25, "wherein" should read -- herein --.

Column 5,
Line 50, "(II) iron" should read -- (II) salts --; and "III" should read -- iron (III) --.

Column 8,
Line 40, "has surprisingly" should read -- has, surprisingly, --.

Column 11,
Line 1, "mocrograms" should read -- micrograms --.

Column 13,
Line 40, "hours." should read -- hours). --.

Column 16,
Line 59, "poly" should read -- poly- --; and
Line 66, "terms" should read -- term --.

Column 17,
Line 7, "large intestine a" should read -- large intestine of a; and
Line 67, "(AND)," should read -- (NAD), --.

Column 18,
Line 2, "1-cis-" should read -- 11-cis- --.

Column 21,
Line 8, "leave" should read -- leaf --.

Column 23,
Line 6, "(7,340" should read -- (8,255 --;
Line 12, "iron" should read -- of iron --; and
Line 52, "USP/" should read -- (USP/ --.

Column 25,
Line 40, "wax);" should read -- Wax); --.

UNITED STATES PATENT AND TRADEMARK OFFICE
CERTIFICATE OF CORRECTION

PATENT NO. : 6,521,247 B1
DATED : February 18, 2003
INVENTOR(S) : Tina deVries

It is certified that error appears in the above-identified patent and that said Letters Patent is hereby corrected as shown below:

Column 26,
Line 32, "aboutmilligrams" should read -- about 1 milligram --.

Column 27,
Line 14, "consisting" should read -- consisting of --;
Line 55, "contains less than a therapeutically effective" should read -- is substantially free of calcium. --; and
Line 56, "amount of calcium." should be deleted.

Column 28,
Line 33, "The" should read -- A --.

Column 29,
Line 36, "more" should read -- from more --.

Column 30,
Line 15, "administering" should read -- administration --;
Line 19, "dissolving" should read -- dissolving iron --; and "1:4:1." should read -- 1.4:1. --;
Line 55, "1:4:1." should read -- 1.4:1. --; and
Line 59, "1.0 milligrams" should read -- 1.0 milligram --.

Signed and Sealed this

Sixteenth Day of March, 2004

JON W. DUDAS
*Acting Director of the United States Patent and Trademark Office*

(12) EX PARTE REEXAMINATION CERTIFICATE (8400th)
United States Patent
deVries

(10) Number: US 6,521,247 C1
(45) Certificate Issued: Jul. 12, 2011

(54) DUAL IRON CONTAINING NUTRITIONAL SUPPLEMENT

(75) Inventor: Tina deVries, Long Valley, NJ (US)

(73) Assignee: Mission Pharmacal Company, San Antonio, TX (US)

Reexamination Request:
No. 90/009,724, Apr. 15, 2010

Reexamination Certificate for:
Patent No.: 6,521,247
Issued: Feb. 18, 2003
Appl. No.: 09/539,360
Filed: Mar. 31, 2000

Certificate of Correction issued Mar. 16, 2004.

Related U.S. Application Data

(60) Provisional application No. 60/148,803, filed on Aug. 13, 1999, and provisional application No. 60/148,806, filed on Aug. 13, 1999.

(51) Int. Cl.
*A23L 1/302* (2006.01)
*A23L 1/303* (2006.01)
*A23L 1/304* (2006.01)

(52) U.S. Cl. .................. 424/439; 424/441; 424/451; 424/452; 424/457; 424/464; 424/465; 424/468; 424/489; 426/73; 426/74; 514/251; 514/276

(58) Field of Classification Search .................. 424/439
See application file for complete search history.

(56) References Cited
PUBLICATIONS

Ironate–B Plus in American Drug Index, C.O. Wilson, et al., J.B. Lippincot Company, Philadelphia and Montreal, 1965, p. 356.
Hurrell, Richard F., "Preventing Iron Deficiency Through Food Fortification," *Nutr. Rev.*, 55(6), 210–222 (1997).
Ex parte Mallard, 61 U.S.P.Q. 525 (Comm. Pat. 1944).
Tamura, Tsunenobu, et al., "Maternal serum folate and zinc concentrations and their relationships to pregnancy outcome," *Am. J. Clin. Nutr.*, 1992; 56: 365–370.

*Primary Examiner*—Evelyn Huang

(57) ABSTRACT

The present invention relates to a nutritional supplement which comprises two different iron compounds, namely a rapidly dissolving iron compound and a slowly dissolving iron compound. The tablet is particularly contemplated for administration to women as a prenatal supplement, during pregnancy, and during lactation. Methods of alleviating iron deficiency and diseases and disorders associated therewith are also disclosed.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19 and 43-56 is confirmed.

Claims 1, 16-17, 22, 24-26, 33-34, 36, 38 and 40-42 are determined to be patentable as amended.

Claims 2-7, 13-15, 18, 20-21, 23, 30-32, 37 and 39, dependent on an amended claim, are determined to be patentable.

Claims 8-12, 27-29 and 35 were not reexamined.

1. A nutritional supplement for a human, the supplement comprising folic acid, a first pharmaceutically acceptable iron compound selected to be slowly dissolving and a second, different pharmaceutically acceptable iron compound selected to be rapidly dissolving, *wherein said first pharmaceutically acceptable iron compound is carbonyl iron*.

16. The nutritional supplement of claim 1, wherein the slowly dissolving iron compound is [selected from the group consisting of] carbonyl iron[, an iron (II) salt, and an iron (III) salt] *having a particle size of less than about 75 micrometers*.

17. The nutritional supplement of claim 1, wherein [each of the iron compounds] *the rapidly dissolving iron compound* is [independently] selected from the group consisting of ferrous fumarate, ferrous sulfate, [ferrous folate, an iron dextran, ferric oxyhydroxide dextran, a chitosan derivative of iron, an oligosaccharide derivative of iron, ferrous acetyl salicylate,] ferrous gluconate, [ferrous diphosphate, carbonyl iron, ferric orthophosphate, ferrous glycine sulfate, ferrous chloride, ferrous ammonium citrate,] ferric ammonium citrate, [ferric ammonium tartrate, ferric phosphate, ferric potassium tartrate, ferric albuminate, ferric cacodylate, ferric hydroxide, ferric pyrophosphate, ferric quinine citrate, ferric valerate, saccharated iron oxide, iron oxide, ferric chloride, ferrous iodide, ferrous nitrate, ferrous glycerophosphate, ferrous formate, an amino acid and iron salt, an iron salt of a protein hydrolysate, ferrous lactate, ferrous tartrate, ferrous succinate, ferrous glutamate, ferrous citrate, ferrous pyrophosphate, ferrous cholinisocitrate, ferrous carbonate, an iron-sugar-carboxylate complex, ferrous sucrate-malate, ferrous sucrate citrate, ferrous fructate-citrate, ferrous sucrate-ascorbate, and ferrous fructate-ascorbate] *and iron-protein succinylate*.

22. [A] *The* nutritional supplement [for a human, the supplement comprising a first pharmaceutically acceptable iron compound selected to be slowly dissolving and a second, different pharmaceutically acceptable iron compound selected to be rapidly dissolving,] *of claim 1*, wherein the amount of elemental iron which is present in the supplement in the form of the slowly dissolving iron compound is greater than the amount of elemental iron which is present in the supplement in the form of the rapidly dissolving iron compound.

24. [A] *The* nutritional supplement [the supplement comprising a first pharmaceutically acceptable iron compound selected to be slowly dissolving and a second, different pharmaceutically acceptable iron compound selected to be rapidly dissolving,] *of claim 1*, wherein the amount of elemental iron which is present in the supplement in the form of the rapidly dissolving iron compound is approximately equal to the amount of elemental iron which is present in the supplement in the form of the slowly dissolving iron compound.

25. [A] *The* nutritional supplement [the supplement comprising a first pharmaceutically acceptable iron compound selected to be slowly dissolving and a second, different pharmaceutically acceptable iron compound selected to be rapidly dissolving,] *of claim 1*, wherein substantially all of the rapidly dissolving iron compound dissolves in less than 3 hours following oral adminstration of the supplement to a human.

26. [A] *The* nutritional supplement [the supplement comprising a first pharmaceutically acceptable iron compound selected to be slowly dissolving and a second, different pharmaceutically acceptable iron compound selected to be rapidly dissolving,] *of claim 1*, wherein less than substantially all of the slowly dissolving iron compound dissolves within about 3 hours following oral administration of the supplement to a human, and wherein substantially all of the slowly dissolving iron compound dissolves in less than about 48 hours following oral administration of the supplement to a human.

33. A method of alleviating an iron deficiency related disease or disorder in a lactating female human, the method comprising administering a nutritional supplement to the lactating female human, wherein the supplement comprises a first pharmaceutically acceptable iron compound selected to be slowly dissolving and a second, different pharmaceutically acceptable iron compound selected to be rapidly dissolving, *wherein said first pharmaceutically acceptable iron compound is carbonyl iron*.

34. A method of alleviating a nutritional disease or disorder in a human fetus, the method comprising administering a nutritional supplement to the human within whom the fetus is developing, wherein the supplement comprises a first pharmaceutically acceptable iron compound selected to be slowly dissolving and a second, different pharmaceutically acceptable iron compound selected to be rapidly dissolving, *wherein said first pharmaceutically acceptable iron compound is carbonyl iron*.

36. A method of alleviating a nutritional disease or disorder in a human infant, the method comprising administering the nutritional supplement to a human female who is nursing the infant, wherein the supplement comprises a first pharmaceutically acceptable iron compound selected to be slowly dissolving and a second, different pharmaceutically acceptable iron compound selected to be rapidly dissolving, *wherein said first pharmaceutically acceptable iron compound is carbonyl iron*.

38. A method of alleviating iron deficiency in a human, the method comprising administering to the human a nutritional supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the slowly dissolving iron compound is greater than the amount of elemental iron which is present in the supplement in the form of the rapidly dissolving iron compound, *and wherein said first pharmaceutically acceptable iron compound is carbonyl iron.*

40. A nutritional supplement for a human, the supplement comprising a first pharmaceutically acceptable iron compound selected to be slowly dissolving and a second, different pharmaceutically acceptable iron compound selected to be rapidly dissolving, wherein the supplement provides a controlled release of the iron absent a release rate modifier, *and wherein said first pharmaceutically acceptable iron compound is carbonyl iron.*

41. A method of alleviating iron deficiency in a human, the method comprising administering to the human a nutritional supplement comprising a first pharmaceutically acceptable iron compound selected to be slowly dissolving and a second, different pharmaceutically acceptable iron compound selected to be rapidly dissolving, wherein the amount of elemental iron which is present in the supplement in the form of the slowly dissolving iron compound is greater than the amount of elemental iron which is present in the supplement in the form of the rapidly dissolving iron compound, and wherein the supplement provides a controlled release of the iron absent a release rate modifier, *and wherein said first pharmaceutically acceptable iron compound is carbonyl iron.*

42. A method of making a nutritional supplement, the method comprising combining a first pharmaceutically acceptable iron compound selected to be slowly dissolving, a second, different pharmaceutically acceptable iron compound selected to be rapidly dissolving, and a pharmaceutically acceptable excipient, wherein the supplement provides a controlled release of the iron absent a release rate modifier, *and wherein said first pharmaceutically acceptable iron compound is carbonyl iron.*

\* \* \* \* \*